(12) United States Patent
Takemoto

(10) Patent No.: US 9,116,336 B2
(45) Date of Patent: Aug. 25, 2015

(54) ZOOM LENS AND IMAGE PICKUP APPARATUS HAVING THE SAME

(71) Applicant: CANON KABUSHIKI KAISHA, Tokyo (JP)

(72) Inventor: Shoichi Takemoto, Saitama (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/286,095

(22) Filed: May 23, 2014

(65) Prior Publication Data

US 2014/0355130 A1 Dec. 4, 2014

(30) Foreign Application Priority Data

May 30, 2013 (JP) .................................. 2013-114180

(51) Int. Cl.
*G02B 15/16* (2006.01)
(52) U.S. Cl.
CPC ...................................... *G02B 15/16* (2013.01)
(58) Field of Classification Search
CPC .......... G02B 15/16; G02B 9/60; G02B 15/14; G02B 13/0045
See application file for complete search history.

(56) References Cited

U.S. PATENT DOCUMENTS 5,764,420 A   6/1998   Yahagi
6,985,303 B2 * 1/2006  Takatsuki ...................... 359/684

FOREIGN PATENT DOCUMENTS

JP     02154216 A   6/1990
JP      0915495 A   1/1997

* cited by examiner

*Primary Examiner* — Joseph P Martinez
(74) *Attorney, Agent, or Firm* — Rossi, Kimms & McDowell LLP

(57) ABSTRACT

A zoom lens includes, in order from the object side, a positive first lens unit which does not move for zooming or focusing, a negative second lens unit which moves during zooming, a positive third lens unit which moves during zooming, a negative fourth lens unit which moves during zooming and focusing, and a positive fifth lens unit which does not move for zooming or focusing. An aperture stop which does not move for zooming or focusing is arranged adjacent to the fourth lens unit. The focal lengths of the second, third, and fourth lens units, a zoom ratio of the zoom lens at infinity focus, the lateral magnification of the third lens unit at the wide angle end and the telephoto end at infinity focus, the lateral magnifications of the fourth and fifth lens units at the telephoto end at infinity focus are appropriately set.

7 Claims, 10 Drawing Sheets

ZOOM LENS AND IMAGE PICKUP APPARATUS HAVING THE SAME

BACKGROUND OF THE INVENTION

1. Field of the Invention

The present invention relates to a zoom lens suitable for use in a television camera, a video camera, a photographic camera, and a digital camera. More particularly, the present invention relates to a small and lightweight zoom lens having a high magnification and high performance.

2. Description of the Related Art

In recent years, opportunities of video shooting have been increasing, because video shooting is conducted with not only conventional video cameras or television cameras for broadcasting but also cameras for still image shooting such as single lens reflex cameras and compact digital cameras. The way of video shooting is not limited to shooting a subject in a fixed composition, but it is sometimes necessary for the photographer to follow or track a moving object to keep it in the image frame during shooting or to perform zooming operation during shooting, as is the case when closing up a plurality of objects during shooting. In such occasions, it is required that focus adjustment be appropriately achieved during zooming. If an object of shooting goes out of focus with a zooming operation, the image is blurred undesirably during zooming. Therefore, it is required for lenses used for video shooting to have an auto-focusing function to keep an object in focus even during zooming operations or a focusing function with which an object can be quickly brought into focus. While opportunities of video shooting have been increasing, it is demanded for zoom lenses to have high magnifications, to be small and lightweight, and to be capable of driving focus with high speed and high accuracy. What is called a rear focus system in which focusing is performed by moving a lens unit closer to the image pickup device than the first lens unit has been developed as a technology for enabling size reduction of zoom lenses and increased focus driving speed. In rear focus systems, the weight of the focus lens unit can be made lighter than that in front focus systems, in which focusing is performed by moving the first lens unit having a large diameter and heavy weight. A further reduction in the zoom lens size can be expected by employing, among others, a rear focus system in which a zoom lens unit also functions as a focus lens unit, because this leads to a reduction in the number of moved units. However, the systems in which a zoom lens unit also serves as a focus lens unit suffer from a problem of change in the angle of field of shooting during focusing and a problem that a desired magnification cannot be achieved by zooming at some focus distances. Japanese Patent Application Laid-Open No. H09-015495 and Japanese Patent Application Laid-Open No. H02-154216 disclose zoom lenses developed paying attention to changes in the zoom ratio with changes in the focus distance, in the case where focusing is performed by moving a zoom lens unit.

Japanese Patent Application Laid-Open No. H09-015495 discloses a five-unit zoom lens employing a rear focus system, in which the second to fourth lens units are zoom lens units, the fourth lens unit is also functions to correct variations in the imaging position with focusing, and the amount of shift of the second lens unit is varied in accordance with the focus distance.

Japanese Patent Application Laid-Open No. H02-154216 discloses a four-unit zoom lens employing a rear focus system, in which focusing is performed by moving zoom lens units, and zoom lens units are moved with focusing so that the zoom ratio is not lowered depending on the object distance.

In the zoom lens disclosed in Japanese Patent Application Laid-Open No. H09-015495, it is necessary in order to achieve a high zoom ratio and to perform focusing by moving a zoom lens unit that the second lens unit is moved over a large distance. Therefore, it is difficult to make the zoom lens small in size and light in weight.

In the zoom lens disclosed in Japanese Patent Application Laid-Open No. H02-154216, it is necessary to provide a plurality of lens units that need to move for focusing, requiring a driving mechanism and a space allowing the driving of the lens units. Therefore, it is difficult to achieve both high zoom ratio and reduction in size and weight.

In order to achieve a high zoom ratio, small size, and small decrease in the zoom ratio at short shooting distances in a compatible manner in a five-unit zoom lens in which the second to fourth lens units are zoom lens units, and the fourth lens unit also functions as a focus lens unit, as is the case with the zoom lens according to the present invention, it is important that the zoom share ratios of the second lens unit and the third lens unit in relation to the zoom ratio of the entirety of the zoom lens be set appropriately.

Moreover, in order to achieve reduction in the size of the focus lens unit and reduction in the amount of movement of the focus lens unit for focusing, it is important that the relationship among the focal lengths of the second to fourth lens units and the relationship among the lateral magnifications of the fourth and subsequent lens units be set appropriately.

SUMMARY OF THE INVENTION

The present invention appropriately determines a zoom share ratio of the zoom lens unit, a refractive power arrangement of the lens units, and lateral magnifications of the lens units to provide a zoom lens that is small in size and light in weight and has reduced decrease in the zoom ratio at short shooting distances and to provide an image pickup apparatus having such a zoom lens.

A zoom lens according to the present invention includes, in order from the object side to the image side, a first lens unit having positive refractive power which does not move for zooming or focusing, a second lens unit having negative refractive power which moves during zooming, a third lens unit having positive refractive power which moves during zooming, a fourth lens unit having negative refractive power which moves during zooming and focusing, and a fifth lens unit having positive refractive power which does not move for zooming or focusing, wherein an aperture stop which does not move for zooming or focusing is arranged adjacent to the fourth lens unit, and the following conditions are satisfied:

$$0.10 < LN(|\beta 3_{tinf}/\beta 3_{winf}|)/LN(Z_{inf}) < 0.70 \tag{1}$$

$$0.35 < |f3/f4| < 0.85 \tag{2},$$

$$1.0 < f4/f2 < 4.0 \tag{3}, \text{ and}$$

$$0.6 < (1-\beta 4_{tinf}^2) \times \beta 5_{tinf}^2 < 4.0 \tag{4},$$

where f2, f3, and f4 are focal lengths of the second lens unit, the third lens unit, and the fourth lens unit respectively, $Z_{inf}$ is a zoom ratio of the zoom lens when the zoom lens is focused on an object at infinity, $\beta 3_{winf}$ and $\beta 3_{tinf}$ are the lateral magnifications of the third lens unit at the wide angle end and at the telephoto end respectively when the zoom lens is focused on an object at infinity, and $\beta 4_{tinf}$ and $\beta 5_{tinf}$ are the lateral magnifications of the fourth lens unit and the fifth lens unit respectively at the telephoto end when the zoom lens is focused on an object at infinity.

According to the present invention, a zoom share ratio of the zoom lens unit, a refractive power arrangement of the lens units, and lateral magnifications of the lens units are appropriately determined, whereby a zoom lens that is small in size and light in weight and has reduced decrease in the zoom ratio at short shooting distances can be provided. An image pickup apparatus having such a zoom lens can also be provided.

Further features of the present invention will become apparent from the following description of exemplary embodiments with reference to the attached drawings.

DESCRIPTION OF THE EMBODIMENTS

Preferred embodiments of the present invention will now be described in detail in accordance with conditional expressions and the accompanying drawings.

The zoom lens according to the present invention includes, in order from the object side to the image side, a first lens unit having positive refractive power which is stationary, a second lens unit having negative refractive power which moves during zooming, a third lens unit having positive refractive power which moves during zooming, a fourth lens unit having negative refractive power which moves during zooming and focusing, and a fifth lens unit having positive refractive power which is stationary.

Figure 9:
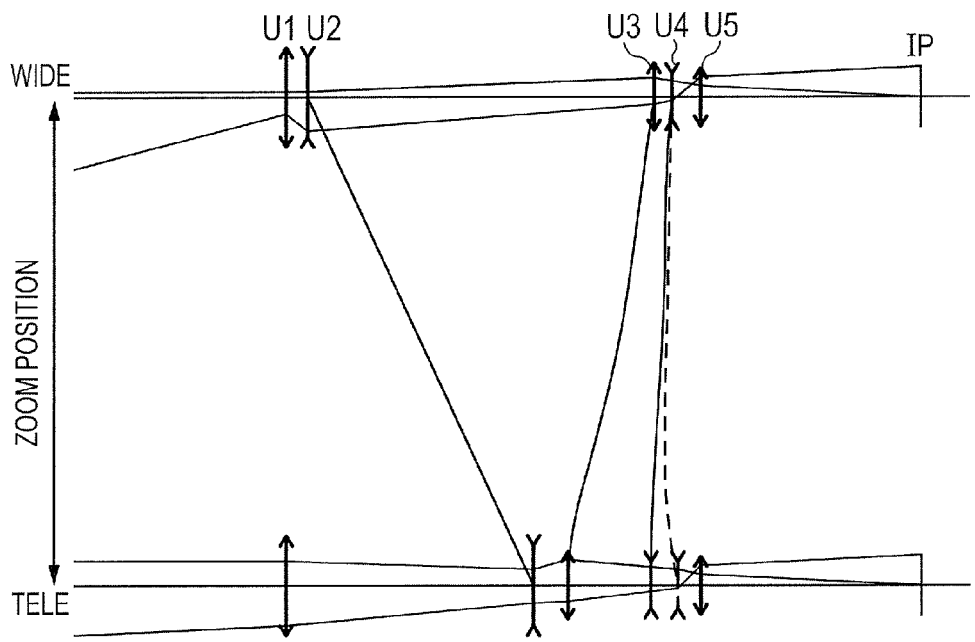
FIG. 9 is a schematic diagram showing moving loci of the lens units during zooming and focusing in a zoom lens according to the present invention.

FIG. 9 is a schematic diagram showing the moving loci of the lens units during zooming and focusing in the present invention. In FIG. 9, moving loci of the first to fifth lens units U1 to U5 are shown with the image plane IP. Among the loci shown in FIG. 9, the loci drawn by the solid lines are moving loci of the lens units with zooming in the state in which the zoom lens is focused at infinity, and the loci drawn in the broken line is the moving loci of the fourth lens unit with zooming in the state in which the zoom lens is focused at the shortest distance.

In zoom lenses according to the embodiments, the zoom share ratios of the zoom lens units, the refractive power arrangement of the lens units, and the lateral magnifications of the lens units are appropriately arranged to achieve zoom lenses that are small and lightweight and have reduced decrease in the zoom ratio at short shooting distances and image pickup apparatuses having such zoom lenses.

Specifically, the zoom lens according to the present invention includes, in order from the object side to the image side, a first lens unit which is stationary, a second lens unit having negative refractive power which moves during zooming, a third lens unit having positive refractive power which moves during zooming, a fourth lens unit having negative refractive power which moves during zooming and focusing, and a fifth lens unit having positive refractive power which is stationary. The zoom lens satisfies the following conditional expressions:

$$0.10 < LN(|\beta 3_{tinf}/\beta 3_{winf}|)/LN(Z_{inf}) < 0.70 \quad (1)$$

$$0.35 < |f3/f4| < 0.85 \quad (2),$$

$$1.0 < f4/f2 < 4.0 \quad (3), \text{ and}$$

$$0.6 < (1-\beta 4_{tinf}^2) \times \beta 5_{tinf}^2 < 4.0 \quad (4),$$

where f2, f3, and f4 are focal lengths of the second lens unit, the third lens unit, and the fourth lens unit respectively, $Z_{inf}$ is the zoom ratio of the entire zoom lens at infinity focus, $\beta 3_{winf}$ and $\beta 3_{tinf}$ are the lateral magnifications of the third lens unit at the wide angle end and at the telephoto end respectively at infinity focus, and $\beta 4_{tinf}$ and $\beta 5_{tinf}$ are the lateral magnifications of the fourth lens unit and the fifth lens unit respectively at the telephoto end at infinity focus.

Conditional expression (1) specifies an appropriate range of the ratio of the natural logarithm of the absolute value of the ratio $\beta 3_{tinf}/\beta 3_{winf}$ of the lateral magnifications of the third lens unit at the wide angle end and at the telephoto end and the natural logarithm of the zoom ratio $Z_{inf}$, namely an appropriate range of the zoom share ratio of the third lens unit. The notation "LN( )" in the conditional expression (1) expresses the natural logarithm of the value in the parentheses. Optical effects of designing the zoom lens to satisfy the range defined by conditional expression (1) will be described in the following.

Figure 10A:
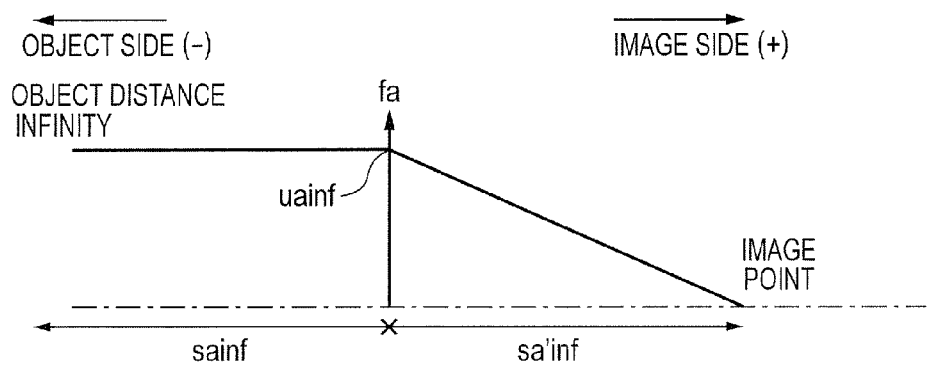
FIG. 10A is a paraxial arrangement diagram showing the relationship between a ray incident on a lens unit, an object point, and an image point.
Figure 10B:
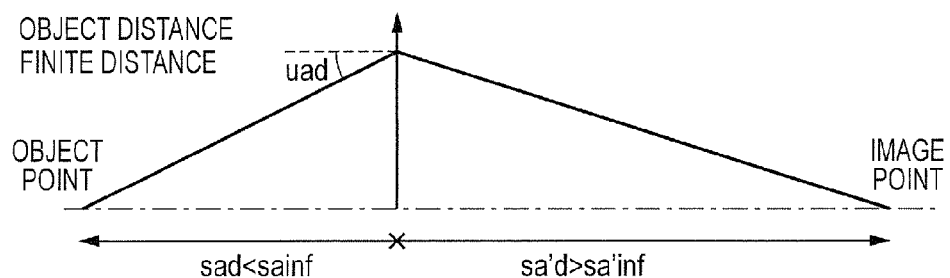
FIG. 10B is a paraxial arrangement diagram showing the relationship between a ray incident on a lens unit, an object point, and an image point.

FIG. 10A is a paraxial arrangement diagram for an axial ray coming from an object point at infinity and incident on a lens unit a having a positive focal length fa. FIG. 10B is a paraxial arrangement diagram for an axial ray coming from an object point at a finite distance and incident on the lens.

In the following description with the paraxial arrangement diagrams, the direction toward the image in the case where rays are incident on a positive lens like in the cases shown in FIGS. 10A and 10B is expressed as the positive direction (+). In FIGS. 10A and 10B, $ua_{inf}$ and $ua_d$ represent incident converted inclination angles on a lens unit. The converted inclination angle is a converted angle obtained by normalizing the focal length of the entire lens to 1. In the case of a zoom lens, the incident converted inclination angle is a physical quantity obtained by normalizing the focal length at the wide angle end to 1.

When the object distance is infinity as shown in FIG. 10A, the incident converted inclination angle $ua_{inf}$ of the axial ray is equal to zero. On the other hand, when the object distance is a finite distance as shown in FIG. 10B, the incident converted inclination angle $ua_d$ of the axial ray is negative, which means that axial rays are incident on the lens as divergent rays. Consequently, the beams exiting from the lens unit a are focused at different points on the optical axis between the case shown in FIG. 10A and in the case shown in FIG. 10B. The relationship of an object point, an image point, and the focal length of a thin lens system is expressed by the following lens formula:

$$1/s' = 1/s + 1/f \quad (A),$$

where s is the distance between the object point from which rays incident on the lens unit come and the lens unit, s' is the distance between the lens unit and the image point formed by the lens unit, and f is the focal length of the lens unit. The values of s and s' are negative on the object side of the lens unit and positive on the image side of the lens unit.

In FIGS. 10A and 10B, $sa_{inf}$ and $sa_d$ correspond to s in formula (A), $sa'_{inf}$ and $sa'_d$ correspond to s', and fa corresponds to f. In the case where the object is at infinity, $sa_{inf}$ in FIG. 10A is infinite, and $sa'_{inf}$ is determined from formula (A) as follows:

$$sa'_{inf} = fa \quad (B).$$

Thus, an image is formed at a position at a distance equal to the focal length fa from the lens unit.

In the case where the object distance is finite, the object distance $sa_d$ in FIG. 10B has a finite value, and an image is formed at a position more distant toward the image than the focal length fa, as indicated as $sa'_d$ in FIG. 10B. The lateral magnification $\beta$ of a lens unit is expressed by the quotient of s' divided by s:

$$\beta = s'/s \quad (C).$$

The relationship between the lateral magnification $\beta_{inf}$ at the infinite object distance and the lateral magnification $\beta_d$ at a finite object distance determined from the relationship between $sa_{inf}$, $sa'_{inf}$, $sa_d$, and $sa'_d$ shown in FIGS. 10A and 10B is as follows:

$$\beta_{inf} > \beta_d \quad (D).$$

It is understood from this that the lateral magnification of the lens unit changes with changes in the object distance.

In the case where the object distance is infinity, $\beta_{inf}$ of the entirety of the lens is infinite or has a divergent value according to formula (C). In the case of a lens system having a stationary first lens unit as with the zoom lens according to the present invention, $\beta_{inf}$ of the partial system constituted by the portion of the lens system closer to the image side than the first lens unit has a finite value. In the following description, the lateral magnification $\beta a_{inf}$ in the case where the object distance is infinite shall refer to the lateral magnification of the partial system as such.

In the case where there is a plurality of lens units, a change in the image point of a lens unit due to a change in the object distance causes a change in the object point of the subsequent lens unit, so that the lateral magnification of the lens unit changes with the object distance.

The change in the lateral magnification is generally formulated as follows:

$$\beta a_d = \beta a_{inf}/(1+\beta a_{inf} \times xa/fa) \quad (E),$$

where xa is the change in the object distance of the a-th lens unit, $\beta a_{inf}$ is the lateral magnification with the infinite object distance, fa is the focal length of the lens unit, $\beta ad$ is the lateral magnification with a finite object distance.

As formulated in equation (E), the lateral magnification at a finite object distance changes depending on the lateral magnification at the infinite object distance, the change in the object point, and the focal length. In the case of a zoom lens, the lateral magnification changes with the zoom position, and the rate of change in the lateral magnification with the object distance changes with changes in the zoom position. In consequence, there arises a problem that the ratio of the imaging magnification at the wide angle end and that at the telephoto end (that is, the zoom ratio) changes with changes in the focus distance. From equation (E) follows that when the focal length and the lateral magnification have the same sign, the smaller focal length is and the larger the lateral magnification $\beta a_{inf}$ is, the larger the change in the lateral magnification with a change in the object distance is. For this reason, the change in the lateral magnification is larger at the telephoto end than at the wide angle end.

For all the lens units ranging from the zoom lens unit closest to the object to the zoom lens unit closest to the image, the zoom ratio is expressed by the ratio of the lateral magnification of each unit at the telephoto end and that at the wide angle end at infinity focus. The zoom ratio $Z_{inf}$ at infinity focus is expressed by the following equation:

$$Z_{inf}=\beta zt_{inf}/\beta zw_{inf} \tag{F}$$

where $\beta zw_{inf}$ is the product of the lateral magnifications of the zoom lens units from the zoom lens unit closest to the object to the zoom lens unit closest to the image at the wide angle end at infinity focus, $\beta zt_{inf}$ is the product of the lateral magnifications of the zoom lens units from the zoom lens unit closest to the object to the zoom lens unit closest to the image at the telephoto end at infinity focus.

The zoom ratio Zmod at the shortest focus distance is expressed by the following equation:

$$Zmod=\beta ztmod/\beta zwmod \tag{G}$$

where βzwmod is the product of the lateral magnifications of the zoom lens units from the zoom lens unit closest to the object to the zoom lens unit closest to the image at the wide angle end at the shortest focus distance, βztmod is the product of the lateral magnifications of the zoom lens units from the zoom lens unit closest to the object to the zoom lens unit closest to the image at the telephoto end at the shortest focus distance.

As formulated in equation (G), the zoom ratio Zmod at the shortest focus distance changes depending on the lateral magnification of the zoom lens units at the shortest focus distance. In this connection, a change in the zoom ratio at the shortest focus distance refers to the ratio $Zmod/Z_{inf}$ of the zoom ratio $Z_{inf}$ at infinity focus and the zoom ratio Zmod at the shortest focus distance. If the value of the ratio of the zoom ratio at infinity focus and that at the shortest focus distance is close to 1, the change in the zoom ratio at the shortest focus distance is small, and a sufficiently large angle of view can be ensured throughout the object distance range from infinity to the shortest distance.

For the above-described reason, when focusing is performed using a zoom lens unit, it is important to determine a paraxial arrangement of lens units taking into consideration changes in the lateral magnification depending on the object distance, particularly at the telephoto end. In the case of a zoom lens having a high zoom ratio like the zoom lens according to the present invention, the lateral magnification of the second lens unit, which is the main zoom lens unit, changes largely with zooming, leading to large changes (or decreases) in the zoom ratio depending on the object distance. In the present invention, the paraxial arrangement is determined in such a way that the lateral magnification of the third lens unit at a short focus distance relative to that at infinity focus is increased. This can compensate for a decrease in the lateral magnification of the second lens unit. Thus, while the zoom lens has a high zoom ratio, the high zoom ratio can be maintained even when the object is at the shortest distance.

The shortest distance mentioned above is the shortest possible distance between an object and the lens. If conditional expression (1) is satisfied, an increase in the overall length of the zoom lens can be controlled while controlling changes (or decreases) in the zoom ratio with changes in the object distance. If the upper limit of conditional expression (1) is not satisfied, the zoom share ratio of the third lens unit is unduly high. The amount of movement of a zoom lens unit during zooming increases in inverse proportion with the refractive power thereof. Therefore, if the zoom share ratio of the third lens unit, which is lower in power than the second lens unit, is excessively high, the sum of the amounts of movement of the second to fourth lens unit becomes large, making it difficult to make the size of the zoom lens small. If the lower limit of conditional expression (1) is not satisfied, the change in the lateral magnification of the second lens unit depending on the object distance is large in the telephoto focal length range, making it difficult to control a change (or decrease) in the zoom ratio at the shortest focus distance.

It is more preferred that conditional expression (1) be further limited in terms of its numerical range as follows:

$$0.13<LN(|\beta 3_{tinf}/\beta 3_{winf}|)/LN(Z_{inf})<0.50 \tag{1a}$$

Conditional expression (2) states a relationship between the focal lengths of the third lens unit and the fourth lens unit. If conditional expression (2) is satisfied, reduction in the size and weight of the zoom lens can be achieved while controlling aberration variation with zooming and focusing.

If the upper limit of conditional expression (2) is not satisfied, the refractive power of the third lens unit is relatively low, necessitating a large amount of movement of the third lens unit with zooming. Then, it is difficult to make the size of the zoom lens small. On the other hand, if the lower limit of conditional expression (2) is not satisfied, the amount of movement of the fourth lens unit with zooming and focusing is necessitated to be large. Then, it is difficult to make the size of the zoom lens small. Moreover, the focal length of the third lens unit is relatively long, leading to deterioration in variation of spherical aberration and coma with zooming.

It is more preferred that conditional expression (2) be further limited in terms of its numerical range as follows:

$$0.50<|f3/f4|<0.75 \tag{2a}$$

Conditional expression (3) states a relationship between the lateral magnification of the second lens unit and the lateral magnification of the fourth lens unit. If conditional expression (3) is satisfied, small size, lightweight, and excellent optical performance can be efficiently achieved.

If the upper limit of conditional expression (3) is not satisfied, the refractive power of the second lens unit is so high that large aberration variation, in particular large variation in spherical aberration and field curvature occurs with zooming. Then, it is difficult to achieve excellent optical performance throughout the entire zoom range. On the other hand, if the lower limit of conditional expression (3) is not satisfied, the refractive power of the fourth lens unit is so high that large variation in aberrations, in particular large variation in spherical aberration and coma occurs with focusing. Then, it is difficult to achieve excellent optical performance throughout the entire focus range. Moreover, the refractive power of the second lens unit is relatively low, necessitating a large amount of movement of the second lens unit during zooming. Then, it is difficult to make the size of the zoom lens small.

It is more preferred that conditional expression (3) be further limited in terms of its numerical range as follows:

$$1.5<f4/f2<3.5 \tag{3a}$$

Conditional expression (4) states a relationship between the lateral magnification of the fourth lens unit and the lateral magnification of the fifth lens unit. Conditional expression (4) relates to the focus sensitivity, which is a relationship between the shift of the fourth lens unit, which is the focus lens unit, along the optical axis and the shift of the image position. If conditional expression (4) is satisfied, controllability in focus driving can be improved while keeping the stroke in focusing small.

If the upper limit of conditional expression (4) is not satisfied, the position of the image plane changes too largely with a shift of the fourth lens unit. Then, high accuracy in the stopped position of the fourth lens unit is required in focusing, making the control difficult. On the other hand, if the lower limit of conditional expression (4) is not satisfied, the amount of shift of the fourth lens unit needed to correct the image point for the same change in the object point becomes unduly large. Then, it is difficult to make the size of the zoom lens small.

It is more preferred that conditional expression (4) be further limited in terms of its numerical range as follows:

$$1.0 < (1-\beta 4_{tinf}^2) \times \beta 5_{tinf}^2 < 3.0 \qquad (4a).$$

As described above, by arranging the zoom share ratio of the third lens unit, the ratio of the refractive powers of the second to fourth lens units, and the relationship of the lateral magnifications of the fourth and subsequent lens units in appropriate ranges, the decrease in the zoom ratio at the shortest focus distance can be made small in the zoom lens having a high zoom ratio and employing a rear-focus system. In embodiments, it is more preferred that one or more of the following conditions be further satisfied.

It is preferred that the zoom lens according to the present invention further satisfy the following conditional expression:

$$0.8 < ft/f1 < 4.0 \qquad (5),$$

where f1 is the focal length of the first lens unit, and ft is the focal length of the entire zoom lens system at the telephoto end. Conditional expression (5) specifies a range of the ratio of the focal length ft at the telephoto end and the focal length f1 of the first lens unit to excellently correct axial chromatic aberration while achieving a high zoom ratio. If the upper limit of conditional expression (5) is not satisfied, the magnification rate of the first lens unit at the telephoto end is so large that it is difficult to correct variation in spherical aberration and axial chromatic aberration in the telephoto range. If the lower limit of conditional expression (5) is not satisfied, the focal lengths of the second to fourth lens units tend to be short, making it difficult to control aberration variation with zooming.

It is preferred that the zoom lens according to the present invention further satisfy the following conditional expression:

$$-10.0 < f1/f2 < -3.0 \qquad (6),$$

where f1 is the focal length of the first lens unit, and f2 is the focal length of the second lens unit. Conditional expression (6) specifies a range of the ratio of the focal length f1 of the first lens unit and the focal length of the second lens unit f2. If conditional expression (6) is satisfied, the amount of shift of the second lens unit during zooming can be decreased, while axial chromatic aberration is corrected excellently. Thus, a high zoom ratio and reduction in the overall length of the zoom lens can be achieved. If the upper limit of conditional expression (6) is not satisfied, the focal length of the second lens unit is relatively short, leading to increased variation in aberrations with zooming, though size reduction is facilitated. If the lower limit of conditional expression (6) is not satisfied, the focal length of the second lens unit is relatively long, leading to an increase in the amount of shift of the second lens unit during zooming. Then, the overall size of the lens system becomes large, making reduction in the size and weight difficult.

It is preferred that the zoom lens according to the present invention further satisfy the following conditional expression:

$$2.0 < f1/f3 < 4.5 \qquad (7),$$

where f1 is the focal length of the first lens unit, and f3 is the focal length of the third lens unit. Conditional expression (7) specifies a range of the ratio of the focal length of the first lens unit and the focal length of the third lens unit. If conditional expression (7) is satisfied, correction of aberrations and reduction in the size and weight of the zoom lens can both be readily achieved. If the upper limit of conditional expression (7) is not satisfied, the refractive power of the third lens unit is too high relative to the refractive power of the first lens unit, leading to large variation in spherical aberration and coma which is difficult to correct. If the lower limit of conditional expression (7) is not satisfied, the refractive power of the third lens unit is too low relative to the refractive power of the first lens unit, leading to a large amount of shift of the third lens unit during zooming. Then, the overall size of the lens system becomes large, making reduction in the size and weight difficult.

It is preferred that the zoom lens according to the present invention further satisfy the following conditional expression:

$$1.0 < |f1/f4| < 4.0 \qquad (8),$$

where f1 is the focal length of the first lens unit, and f4 is the focal length of the fourth lens unit. Conditional expression (8) specifies a range of the ratio of the focal length of the first lens unit and the focal length of the fourth lens unit. If conditional expression (8) is satisfied, correction of aberrations and reduction in the size and weight of the zoom lens can both be readily achieved. If the upper limit of conditional expression (8) is not satisfied, the refractive power of the fourth lens unit is too high relative to the refractive power of the first lens unit, leading to large variation in spherical aberration and coma which is difficult to correct. If the lower limit of conditional expression (8) is not satisfied, the refractive power of the fourth lens unit is too low relative to the refractive power of the first lens unit, leading to a large amount of shift of the fourth lens unit for correction of the image point. Then, it is difficult to achieve reduction in the size and weight of the zoom lens.

As a further feature of the zoom lens according to the present invention, a relationship between the focus sensitivity and the image size of the image pickup device on which the zoom lens is mounted may be determined. Specifically, it is preferred that the following conditional expression be satisfied:

$$0.02 < [(1-(\beta 4_{tinf}^2) \times \beta 5_{tinf}^2]/IS < 0.25 \qquad (9),$$

where, IS is the image size of an image pickup device of an image pickup apparatus to which the zoom lens is mounted.

Conditional expression (9) is a condition concerning a physical quantity obtained by normalizing the focus sensitivity $(1-\beta 4_{tinf}^2) \times \beta 5_{tinf}^2$ by the image size IS. If conditional expression (9) is satisfied, controllability in focus driving can be improved while keeping the stroke in focusing small. The longer the focal length of the lens is, the larger the amount of shift of the focus lens unit is. For the same angle of field, the larger the image size is, the longer the focal length of the lens is. Therefore, the larger the image size is, the larger the amount of shift of the focus lens unit is. Therefore, it is preferred that the focus sensitivity be determined taking into consideration the image size of the image pickup apparatus on which the zoom lens is mounted in such a way as to satisfy conditional expression (9). If the upper limit of conditional expression (9) is not satisfied, the position of the image point changes too large with a shift of the fourth lens unit. Then, high accuracy in the stopped position of the fourth lens unit is required in focusing, making the control difficult. On the other hand, if the lower limit of conditional expression (9) is not satisfied, the amount of shift of the fourth lens unit needed to correct the image point for the same change in the object point becomes large. Then, it is difficult to make the size of the zoom lens small. The image size IS refers to the diagonal length of the effective area of the image pickup device and is calculated by the following equation (12):

$$IS = 2 \times fw \times \tan(\omega w) \quad (12).$$

It is more preferred that the numerical ranges of conditional expressions (5) to (8) be further limited as follows:

$$1.0 < ft/f1 < 3.0 \quad (5a),$$

$$-7.0 < f1/f2 < -3.0 \quad (6a),$$

$$2.2 < f1/f3 < 3.7 \quad (7a), \text{ and}$$

$$1.3 < |f1/f4| < 2.8 \quad (8a).$$

It is preferred that the zoom lens according to the present invention further satisfy the following conditional expression:

$$0.60 < Z_{mod}/Z_{inf} \leq 1.50 \quad (10),$$

where $Z_{inf}$ is the zoom ratio of the entire lens system at the infinite object distance, and $Z_{mod}$ is the zoom ratio of the entire zoom lens system at the shortest object distance. Conditional expression (10) relates to the ratio of the angle of field at the wide angle end and that at the telephoto end in the state in which the zoom lens is focused at a finite distance, in particular at the shortest distance. Specifically, conditional expression (10) specifies a range of the rate of change in the above-mentioned ratio relative to the design value. Conditional expression (10) is a condition for reducing incongruity to the user and change in the angle of field. If the upper limit of conditional expression (10) is not satisfied, the zoom ratio in the state in which the zoom lens is focused at a finite distance is so large that the user may feel a sense of incongruity. On the other hand, if the lower limit is not satisfied, the zoom ratio in the state in which the zoom lens is focused at a finite distance is so small that an expected angle of field may be difficult to be achieved.

As a further feature of the zoom lens according to the present invention, an aperture stop that does not move during zooming or focusing along the direction of the optical axis may be provided adjacent to the fourth lens unit.

Figure 12:
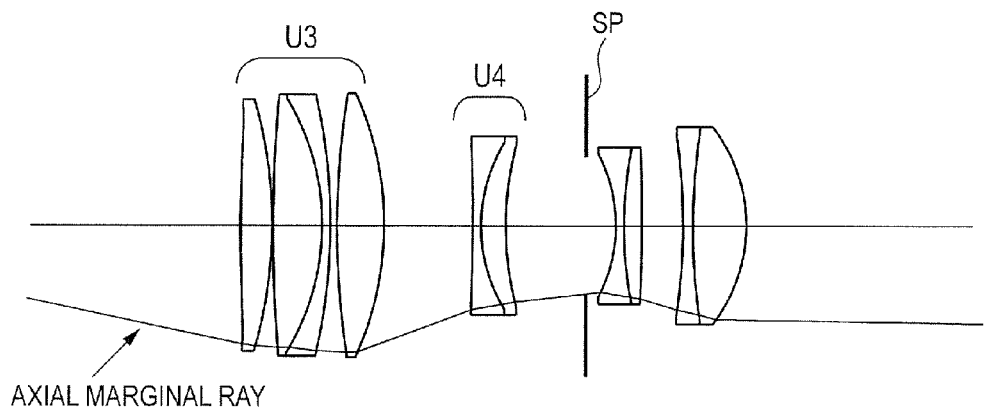
FIG. 12 is an optical path diagram for an axial marginal ray in the fourth lens unit of the first embodiment at f=60 mm.

If the fourth lens unit is located at a position adjacent to the aperture stop that does not move along the direction of the optical axis at a certain zoom position between the wide angle end and the telephoto end, an increase in the lens diameter can be controlled. FIG. 12 is an optical path diagram for a zoom lens according to a first embodiment, which shows an axial marginal ray at a telephoto zoom position (f=60 mm) at which the effective diameter of the fourth lens unit is determined. When seen in the direction from the aperture stop toward the object, the axial marginal ray is incident on the fourth lens unit at a divergent angle as shown in FIG. 10B. In consequence, the more distant from the aperture stop the fourth lens unit is, the larger the lens diameter of the fourth lens unit is necessitated to be. Therefore, in order to reduce the lens diameter, it is important to locate the fourth lens unit adjacent to the aperture stop. It is preferred that the following condition be satisfied:

$$1.0 \text{ (mm)} < Dspw < 35.0 \text{ (mm)} \quad (11),$$

where Dspw is the air distance between the fourth lens unit and the aperture stop at infinity focus.

The aperture stop may be arranged adjacent to the fourth lens unit either on its image side or the object side. It is more preferred that the aperture stop be arranged on the image side of the fourth lens unit. The aperture stop is disposed adjacent to the fourth lens unit on either the image side or the object side. Preferably, the aperture stop is disposed adjacent to the fourth lens unit on the image side. Because, in a case where the aperture stop is disposed adjacent to the fourth lens unit on the image side, the aperture stop which does not move for focusing and zooming is not disposed between the third lens unit which moves during zooming and the fourth lent unit which moves during zooming and focusing, so that each of the lens units can be disposed with high degree of freedom to thereby result in a better correction of aberration variation in comparison to a case where the aperture stop is disposed adjacent to the fourth lens unit on the object side.

If the upper limit of conditional expression (11) is not satisfied, it is difficult to make the size of the zoom lens small. On the other hand, if the lower limit is not satisfied, the distance between the aperture stop and the fourth lens unit is so small that the driving mechanism for the aperture stop and the driving mechanism for the fourth lens unit interfere undesirably. Since the fourth lens unit moves for both zooming and focusing, it is preferred that the weight of the fourth lens unit be as small as possible. If the fourth lens unit is small in diameter and light in weight, high speed focus driving can be achieved. Moreover, in the case where the fourth lens unit is driven by an electric device such as an ultrasonic motor, the light weight leads to small work for driving the fourth lens unit, advantageously leading to reduction in electrical power needed for driving. Since the work is the product of the shift of the lens unit and the weight, a reduction in the weight leads to a reduction in the work.

In the following, specific configurations of the zoom lens according to the present invention will be described as embodiments together with lens configurations of numerical embodiments associated with them.

First Embodiment

Figure 1:
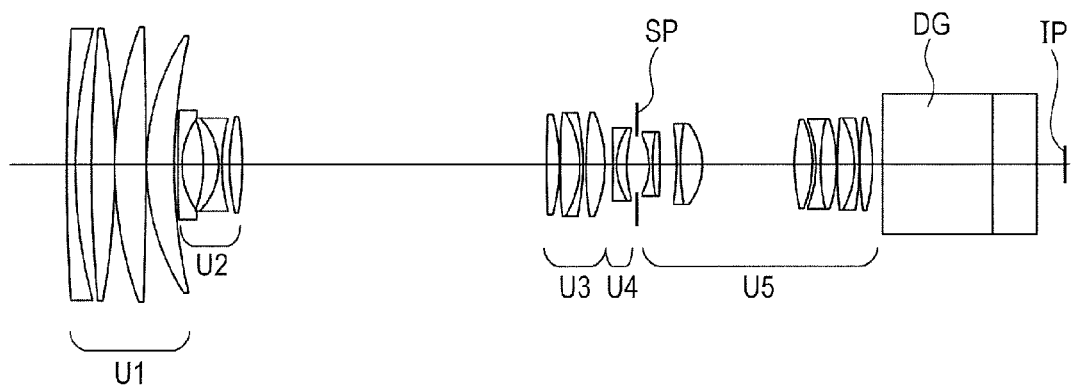
FIG. 1 is a cross sectional view of a zoom lens according to a first embodiment in the state in which the zoom lens is focused at infinity at the wide angle end.
Figure 2A:
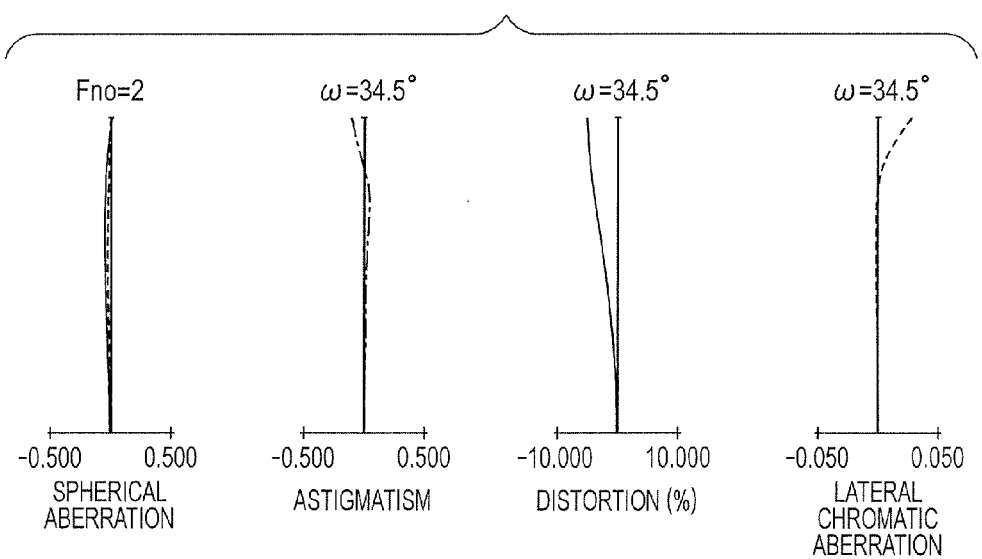
FIG. 2A shows aberration diagrams of the zoom lens according to the first embodiment at infinity focus at the wide angle end.
Figure 2B:
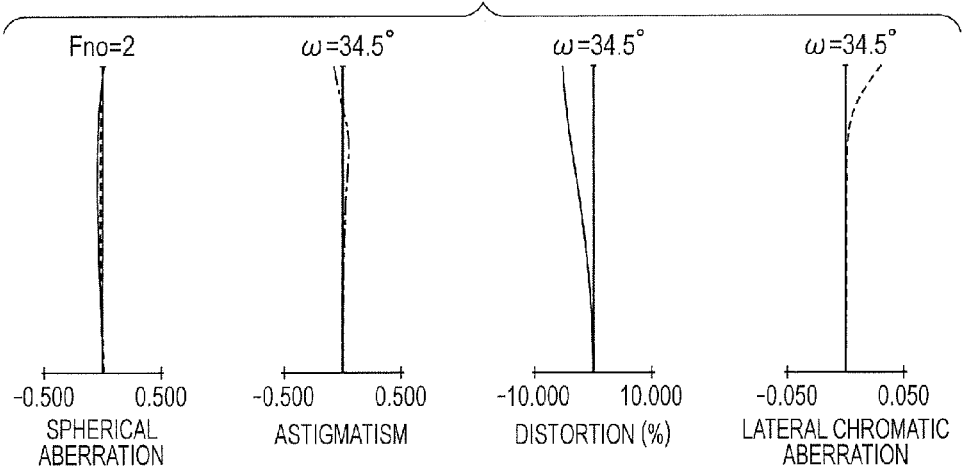
FIG. 2B shows aberration diagrams of the zoom lens according to the first embodiment at the shortest focus distance (900 mm from the first surface) at the wide angle end.
Figure 2C:
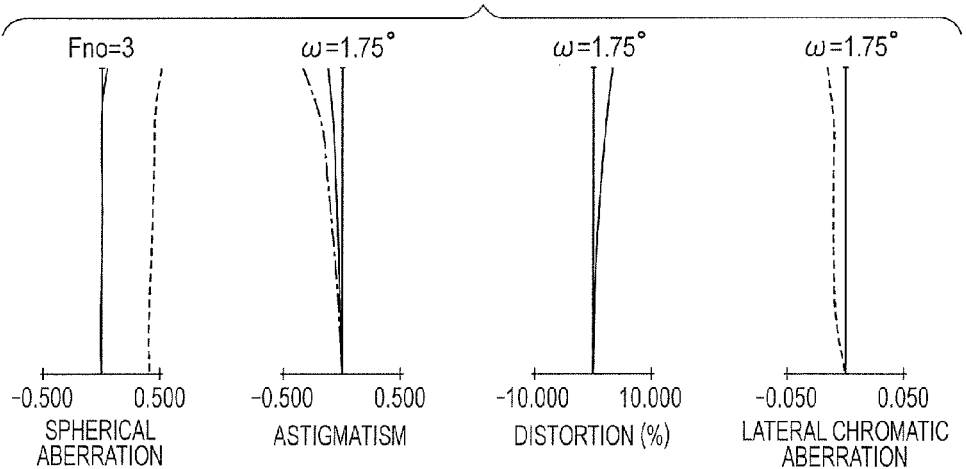
FIG. 2C shows aberration diagrams of the zoom lens according to the first embodiment at infinity focus at the telephoto end.
Figure 2D:
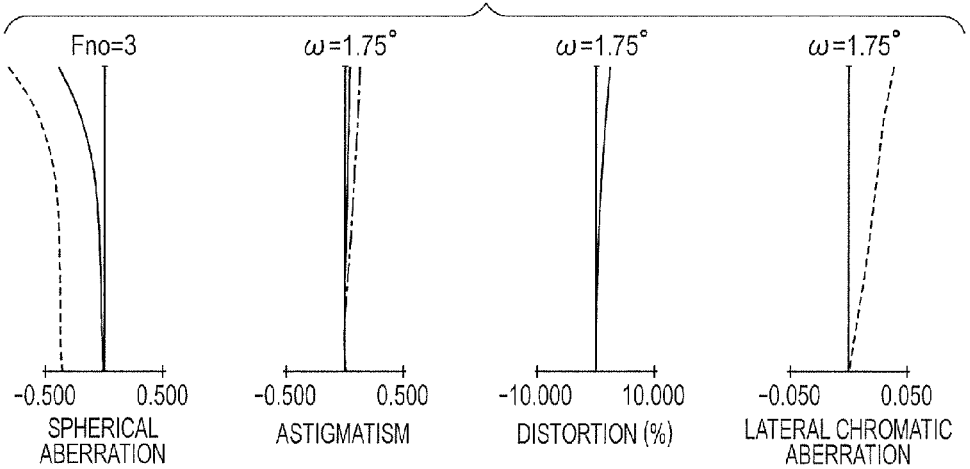
FIG. 2D shows aberration diagrams of the zoom lens according to the first embodiment at the shortest focus distance (900 mm from the first surface) at the telephoto end.

FIG. 1 is a cross sectional view of a zoom lens according to numerical embodiment 1 as a first embodiment of the present invention in the state in which the zoom lens is focused on an object at infinity at the wide angle end (i.e. at the shortest focal length). FIG. 2A shows aberration diagrams of the zoom lens at infinity focus at the wide angle end. FIG. 2B shows aberration diagrams of the zoom lens at the shortest focus distance (900 mm from the first surface) at the wide angle end. FIG. 2C shows aberration diagrams of the zoom lens at infinity focus at the telephoto end. FIG. 2D shows aberration diagrams of the zoom lens at the shortest focus distance (900 mm from the first surface) at the telephoto end. In the cross sectional views of the zoom lenses according to this and following embodiments, the left side is the object side (or front side), and the right side is the image side (or rear side). The zoom lens includes a first lens unit U1 having positive refractive power, a second lens unit U2 having negative refractive power, a third lens unit U3 having positive refractive power, a fourth lens unit U4 having negative refractive power, an aperture stop SP, and a fifth lens unit (relay unit) U5 having a positive refractive power. The first lens unit U1 does not move. The second lens unit U2 moves during zooming. More specifically, the second lens unit U2 moves toward the image side along the optical axis to effect zooming from the wide angle end to the telephoto end. The third lens unit U3 and the fourth lens unit U4 move during zooming. More specifically, the third lens unit U3 and the fourth lens unit U4 move along the optical axis during zooming from the wide angle end to the telephoto end. Moreover, the fourth lens unit U4 moves along the optical axis also for focusing. The aperture stop SP does not move along the optical axis direction. The fifth lens unit U5 does not move and has an imaging effect. A converter (extender) or the like for changing the focal length may be provided in the fifth lens unit U5. The zoom lens also includes a section illustrated as a glass block DG, which may include a color separation prism and/or an optical filter etc. The image plane IP is also shown in FIG. 1. The image plane IP corresponds to an image pickup surface such as a solid-state image pickup device and a film surface. Referring to the aberration diagrams, in the diagrams of spherical aberration, the solid curves and the broken curves are for the e-line and the g-line respectively. In the diagrams of astigmatism, the solid curves and the dot-and-dash curves are astigmatism on the sagittal image plane (ΔS) and astigmatism on the meridional image plane (ΔM) respectively. Lateral chromatic aberration represented by broken curves is for the g-line. Astigmatism and lateral chromatic aberration shown in the diagrams are aberrations in the case where a ray at the center of the beams at the position of the stop is the principal ray. In the aberration diagrams, the half angle of field ω and the F-number Fno are also shown. In the lateral aberration diagrams, spherical aberration is shown in a scale of 0.5 mm, astigmatism is shown in a scale of 0.5 mm, distortion is shown in a scale of 10%, and lateral chromatic aberration is shown in a scale of 0.005 mm. In the description of this and following embodiments, the terms "wide angle end" and the "telephoto end" refer to the zoom positions which are assumed when the zooming lens unit is located at both ends of its mechanically movable range along the optical axis. The above description about the cross sectional view and the aberration diagrams also apply to those in the other embodiments described in the following, unless particularly stated.

The second lens unit U2, the third lens unit U3, and the fourth lens unit U4 are movable lens units in numerical embodiment 1 as the first embodiment. These lens units will be described more specifically. The second lens unit U2 includes the 9th to 15th lens surfaces in numerical embodiment 1. The second lens unit U2 includes, in order from the object side to the image side, a negative lens, a negative cemented lens made up of a positive lens and a negative lens which are arranged in the mentioned order and cemented together, and a positive lens. The third lens unit U3 includes the 16th to 22nd lens surfaces in numerical embodiment 1. The third lens unit U3 includes, in order from the object side to the image side, a positive lens, a positive cemented lens made up of a positive lens and a negative lens which are arranged in the mentioned order and cemented together, and a positive lens. The fourth lens unit U4 includes the 23rd to 25th lens surfaces in numerical embodiment 1. The fourth lens unit U4 includes a negative cemented lens made up of a negative lens and a positive lens arranged in the mentioned order from the object side and cemented together. The 9th and 16th surfaces are aspheric surfaces. The 9th lens surface mainly contributes to correction of off-axial aberrations in the wide angle range. The 16th lens surface contributes to correction of variation of coma and spherical aberration with zooming.

Values associated with the conditional expressions in this embodiment are shown in Table 1. This numerical embodiment satisfies all the conditional expressions and achieves a wide angle with a focal length of 8.0 mm at the wide angle end and a high zoom ratio of 22.5 while having excellent optical performance. Furthermore, while the zoom lens according to this embodiment is configured to perform focusing using the fourth lens unit which is small and lightweight, the ratio of the angle of field at the wide angle end and that at the telephoto end, or the zoom ratio is as high as 16.5 even when the zoom lens is focused at the shortest distance (0.9 m from the vertex of the first lens surface to the object).

Second Embodiment

Figure 3:
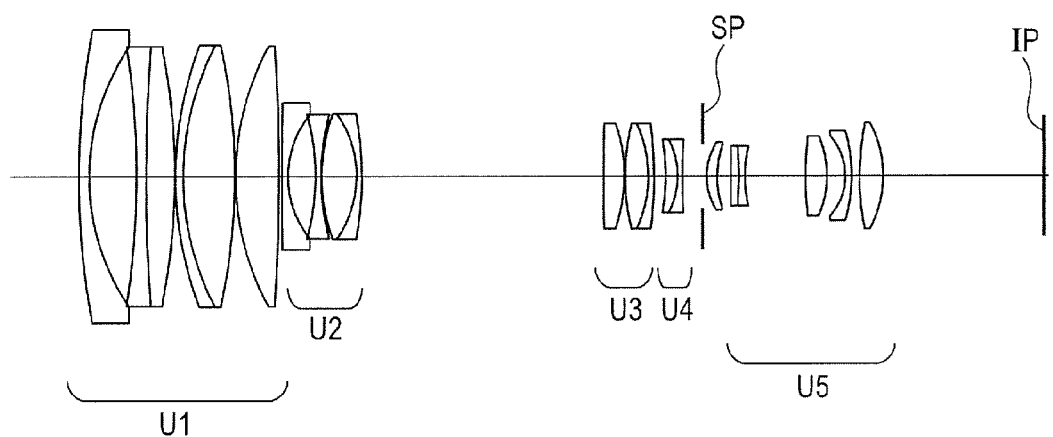
FIG. 3 is a cross sectional view of a zoom lens according to a second embodiment in the state in which the zoom lens is focused at infinity at the wide angle end.
Figure 4A:
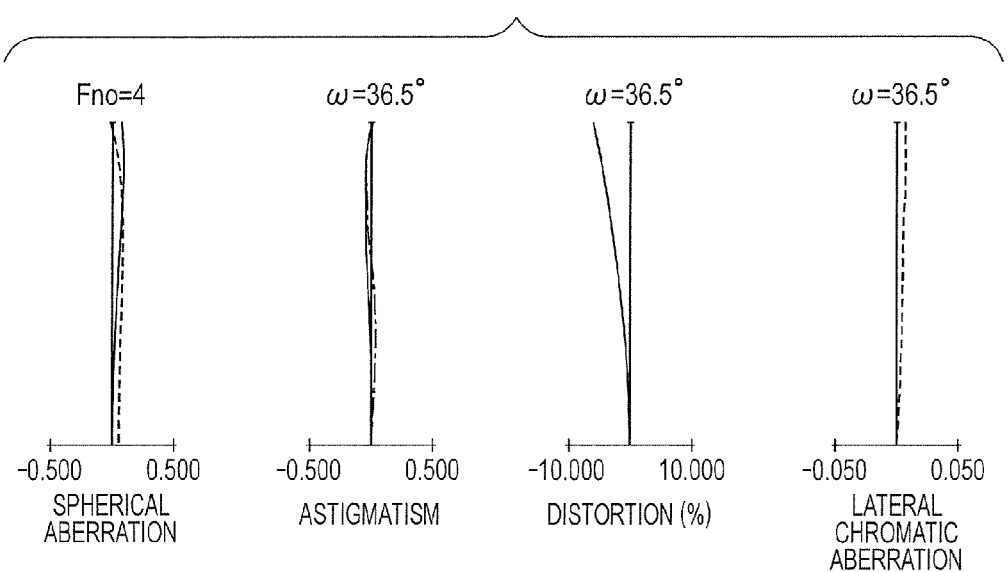
FIG. 4A shows aberration diagrams of the zoom lens according to the second embodiment at infinity focus at the wide angle end.
Figure 4B:
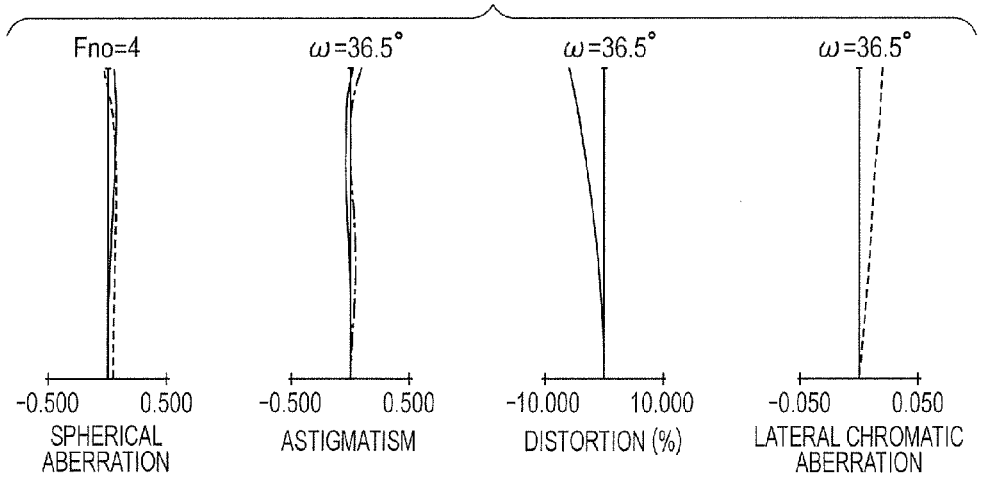
FIG. 4B shows aberration diagrams of the zoom lens according to the second embodiment at the shortest focus distance (1000 mm from the image plane) at the wide angle end.
Figure 4C:
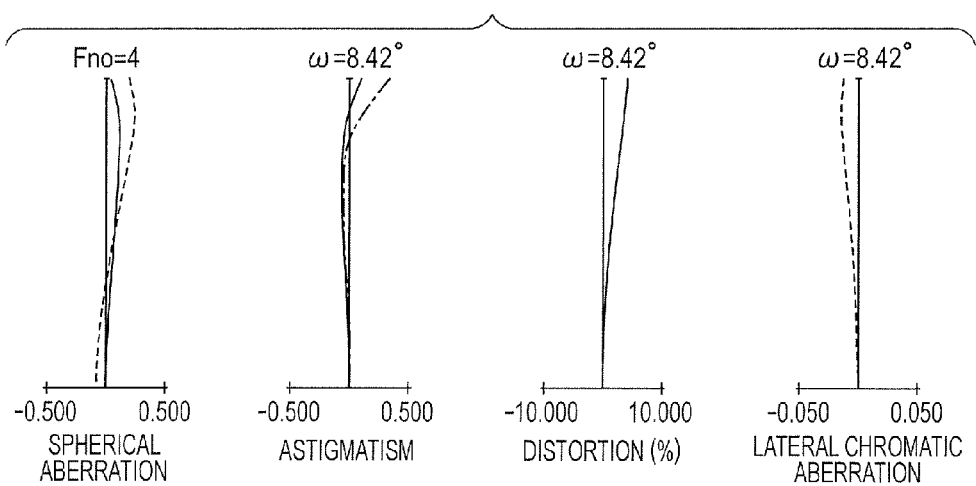
FIG. 4C shows aberration diagrams of the zoom lens according to the second embodiment at infinity focus at the telephoto end.
Figure 4D:
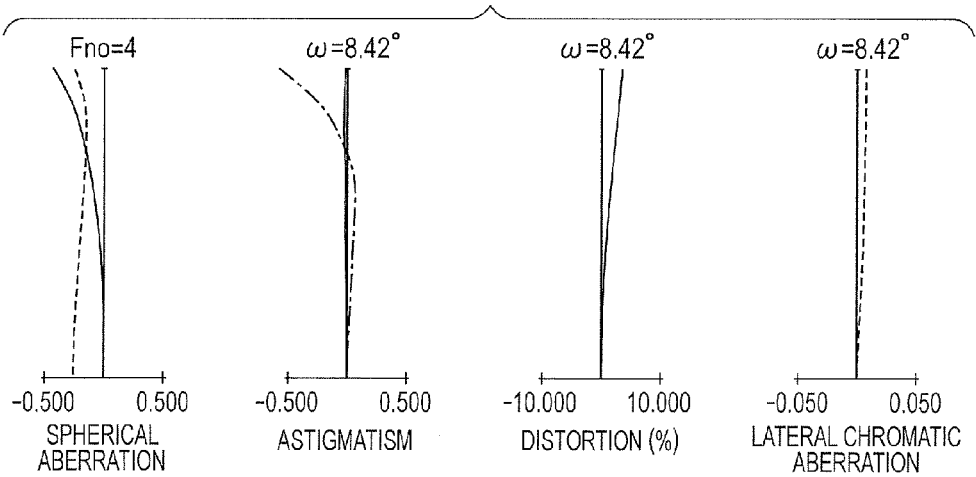
FIG. 4D shows aberration diagrams of the zoom lens according to the second embodiment at the shortest focus distance (1000 mm from the image plane) at the telephoto end.

FIG. 3 is a cross sectional view of a zoom lens according to numerical embodiment 2 as a second embodiment of the present invention in the state in which the zoom lens is focused on an object at infinity at the wide angle end (i.e. at the shortest focal length). FIG. 4A shows aberration diagrams of the zoom lens at infinity focus at the wide angle end. FIG. 4B shows aberration diagrams of the zoom lens at the shortest focus distance (1000 mm from the first surface) at the wide angle end. FIG. 4C shows aberration diagrams of the zoom lens at infinity focus at the telephoto end. FIG. 4D shows aberration diagrams of the zoom lens at the shortest focus distance (1000 mm from the first surface) at the telephoto end.

The second lens unit U2, the third lens unit U3, and the fourth lens unit U4 are movable lens units in numerical embodiment 2 as the second embodiment. These lens units will be described more specifically. The second lens unit U2 includes the 11th to 17th lens surfaces in numerical embodiment 2. The second lens unit U2 includes, in order from the object side to the image side, two negative lenses and a positive cemented lens made up of a positive lens and a negative lens which are arranged in the mentioned order and cemented together. The third lens unit U3 includes the 18th to 22nd lens surfaces in numerical embodiment 2. The third lens unit U3 includes, in order from the object side to the image side, a positive lens and a positive cemented lens made up of a positive lens and a negative lens which are arranged in the mentioned order and cemented together. The fourth lens unit U4 includes the 23rd to 25th lens surfaces in numerical embodiment 2. The fourth lens unit U4 includes a negative cemented lens made up of a negative lens and a positive lens arranged in the mentioned order from the object side to the image side and cemented together. The 11th surface is an aspheric surface. The 11th lens surface mainly contributes to correction of off-axial aberrations in the wide angle range.

Values associated with the conditional expressions in this embodiment are shown in Table 1. This numerical embodiment satisfies all the conditional expressions and achieves a wide angle with a focal length of 20.00 mm at the wide angle end and a high zoom ratio of 5.0 while having excellent optical performance. Furthermore, while the zoom lens according to this embodiment is configured to perform focusing using the fourth lens unit which is small and lightweight, the ratio of the angle of field at the wide angle end and that at the telephoto end, or the zoom ratio is as high as 4.8 even when the zoom lens is focused at the shortest distance (1.0 m from the image plane to the object).

Third Embodiment

Figure 5:
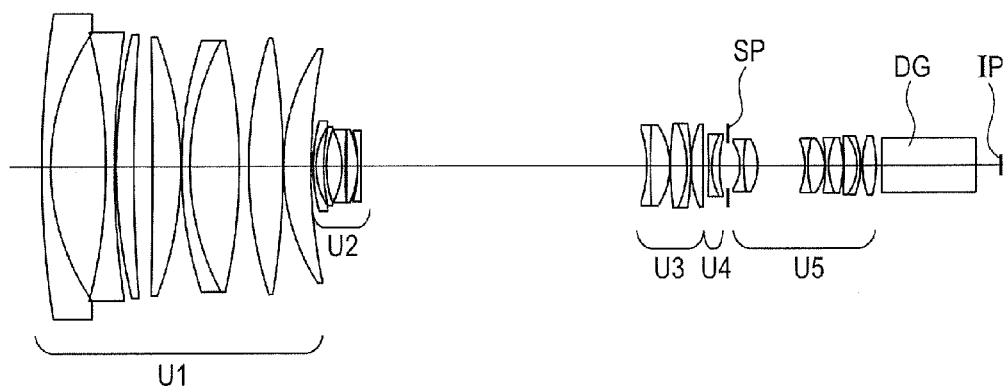
FIG. 5 is a cross sectional view of a zoom lens according to a third embodiment in the state in which the zoom lens is focused at infinity at the wide angle end.
Figure 6A:
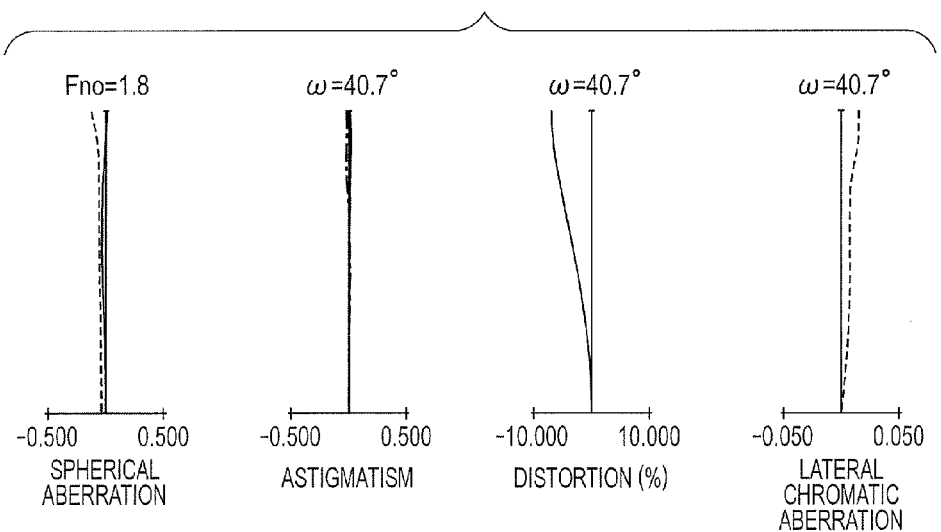
FIG. 6A shows aberration diagrams of the zoom lens according to the third embodiment at infinity focus at the wide angle end.
Figure 6B:
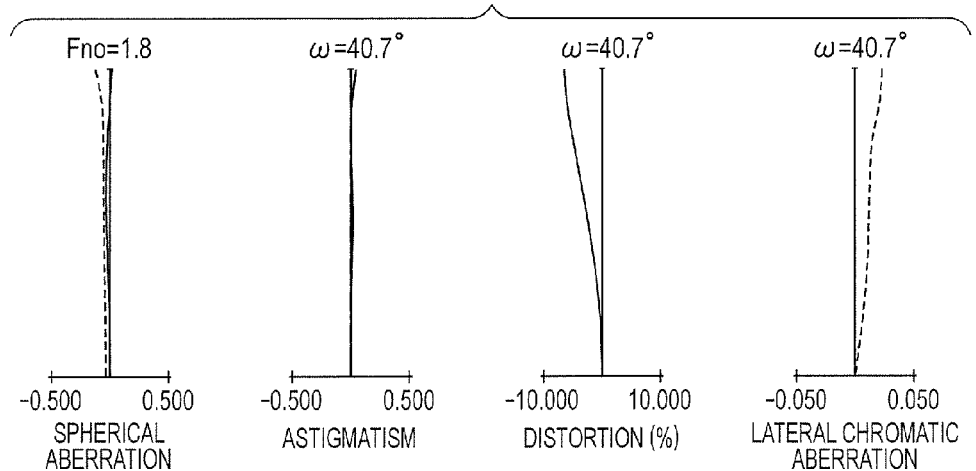
FIG. 6B shows aberration diagrams of the zoom lens according to the third embodiment at the shortest focus distance (600 mm from the first surface) at the wide angle end.
Figure 6C:
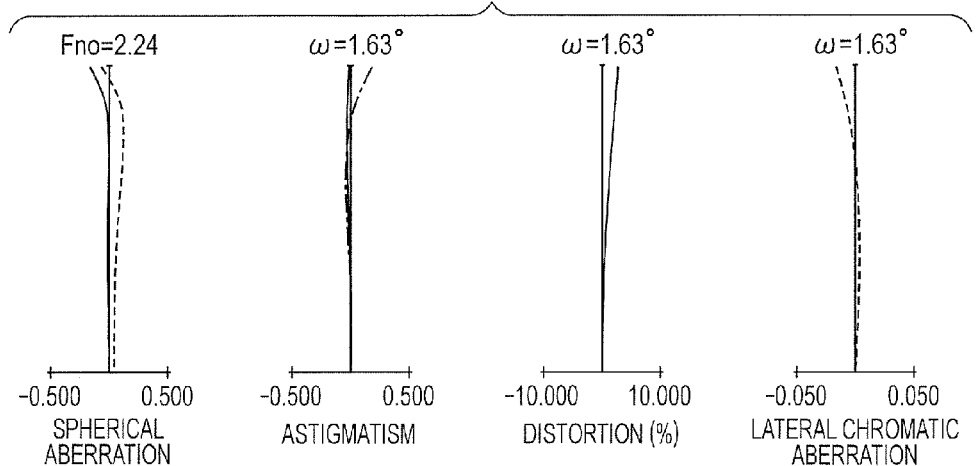
FIG. 6C shows aberration diagrams of the zoom lens according to the third embodiment at infinity focus at the telephoto end.
Figure 6D:
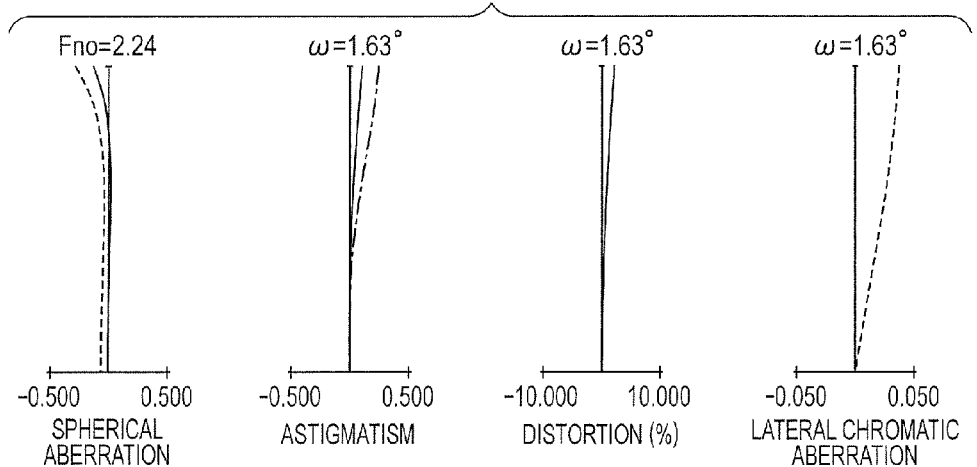
FIG. 6D shows aberration diagrams of the zoom lens according to the third embodiment at the shortest focus distance (600 mm from the first surface) at the telephoto end.

FIG. 5 is a cross sectional view of a zoom lens according to numerical embodiment 3 as a third embodiment of the present invention in the state in which the zoom lens is focused on an object at infinity at the wide angle end (i.e. at the shortest focal length). FIG. 6A shows aberration diagrams of the zoom lens at infinity focus at the wide angle end. FIG. 6B shows aberration diagrams of the zoom lens at the shortest focus distance (600 mm from the first surface) at the wide angle end. FIG. 6C shows aberration diagrams of the zoom lens at infinity focus at the telephoto end. FIG. 6D shows aberration diagrams of the zoom lens at the shortest focus distance (600 mm from the first surface) at the telephoto end.

The second lens unit U2, the third lens unit U3, and the fourth lens unit U4 are movable lens units in numerical embodiment 3 as the third embodiment. These lens units will be described more specifically. The second lens unit U2 includes the 16th to 25th lens surfaces in numerical embodiment 3. The second lens unit U2 includes, in order from the object side to the image side, three negative lenses, a positive lens, and a negative lens. The third lens unit U3 includes the 26th to 33rd lens surfaces in numerical embodiment 3. The third lens unit U3 includes, in order from the object side to the image side, a negative cemented lens made up of a negative lens and a positive lens which are arranged in the mentioned order and cemented together, a positive cemented lens made up of a positive lens and a negative lens which are arranged in the mentioned order and cemented together, and a positive lens. The fourth lens unit U4 includes the 34th to 36th lens surfaces in numerical embodiment 3. The fourth lens unit U4 includes a negative cemented lens made up of a negative lens and a positive lens arranged in the mentioned order from the object side to the image side and cemented together.

Values associated with the conditional expressions in this embodiment are shown in Table 1. This numerical embodiment satisfies all the conditional expressions and achieves a wide angle with a focal length of 6.4 mm at the wide angle end and a high zoom ratio of 30.25 while having excellent optical performance. Furthermore, while the zoom lens according to this embodiment is configured to perform focusing using the fourth lens unit which is small and lightweight, the ratio of the angle of field at the wide angle end and that at the telephoto end, or the zoom ratio is as high as 21.0 even when the zoom lens is focused at the shortest distance (0.6 m from the vertex of the first lens surface to the object).

Fourth Embodiment

Figure 7:
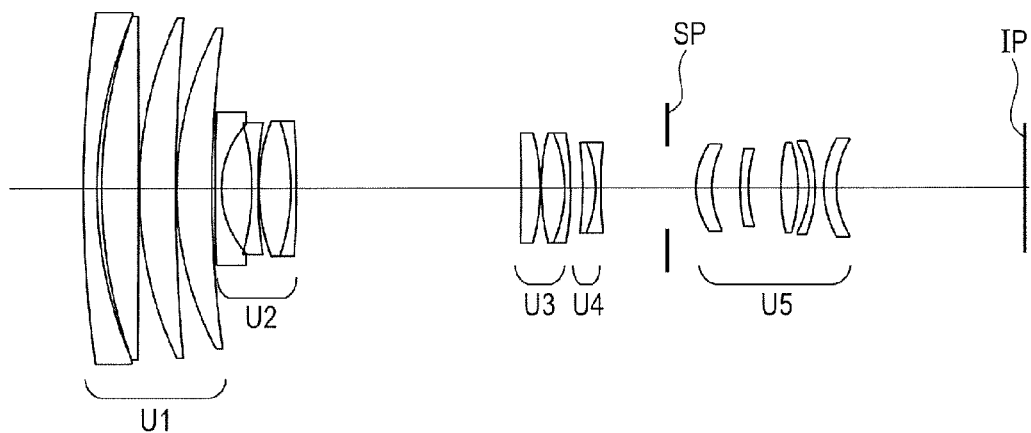
FIG. 7 is a cross sectional view of a zoom lens according to a fourth embodiment in the state in which the zoom lens is focused at infinity at the wide angle end.
Figure 8A:
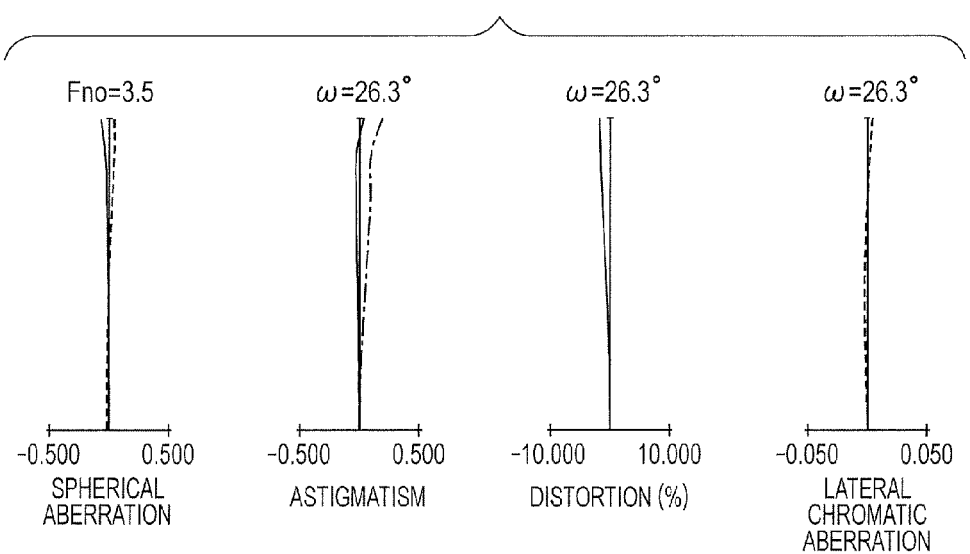
FIG. 8A shows aberration diagrams of the zoom lens according to the fourth embodiment at infinity focus at the wide angle end.
Figure 8B:
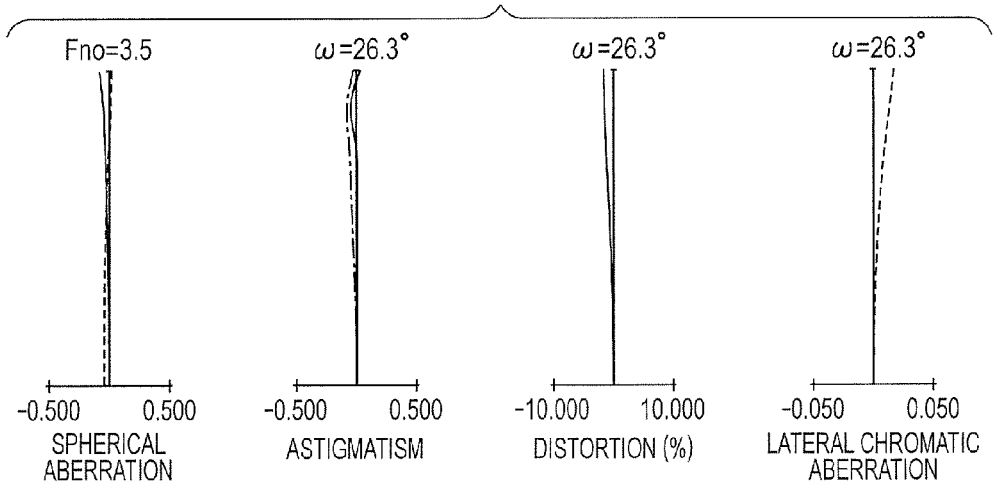
FIG. 8B shows aberration diagrams of the zoom lens according to the fourth embodiment at the shortest focus distance (1000 mm from the image plane) at the wide angle end.
Figure 8C:
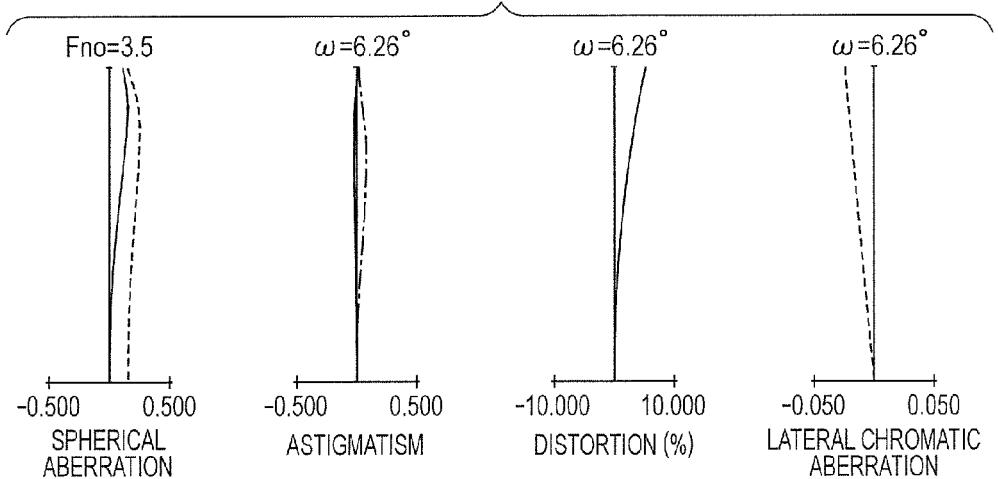
FIG. 8C shows aberration diagrams of the zoom lens according to the fourth embodiment at infinity focus at the telephoto end.
Figure 8D:
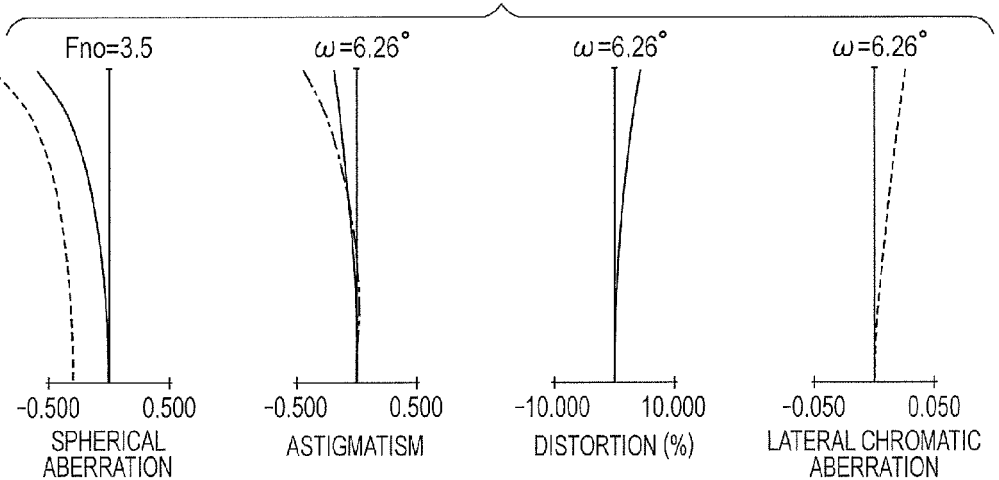
FIG. 8D shows aberration diagrams of the zoom lens according to the fourth embodiment at the shortest focus distance (1000 mm from the image plane) at the telephoto end.

FIG. 7 is a cross sectional view of a zoom lens according to numerical embodiment 4 as a fourth embodiment of the present invention in the state in which the zoom lens is focused on an object at infinity at the wide angle end (i.e. at the shortest focal length). FIG. 8A shows aberration diagrams of the zoom lens at infinity focus at the wide angle end. FIG. 8B shows aberration diagrams of the zoom lens at the shortest focus distance (1000 mm from the first surface) at the wide angle end. FIG. 8C shows aberration diagrams of the zoom lens at infinity focus at the telephoto end. FIG. 8D shows aberration diagrams of the zoom lens at the shortest focus distance (1000 mm from the first surface) at the telephoto end.

The second lens unit U2, the third lens unit U3, and the fourth lens unit U4 are movable lens units in numerical embodiment 4 as the fourth embodiment. These lens units will be described more specifically. The second lens unit U2 includes the 9th to 15th lens surfaces in numerical embodiment 4. The second lens unit U2 includes, in order from the object side, two negative lenses and a positive cemented lens made up of a positive lens and a negative lens which are arranged in the mentioned order and cemented together. The third lens unit U3 includes the 16th to 20th lens surfaces in numerical embodiment 4. The third lens unit U3 includes, in order from the object side to the image side, a positive lens and a positive cemented lens made up of a positive lens and a negative lens which are arranged in the mentioned order and cemented together. The fourth lens unit U4 includes the 21st to 23rd lens surfaces in numerical embodiment 4. The fourth lens unit U4 includes a negative cemented lens made up of a negative lens and a positive lens arranged in the mentioned order from the object side to the image side and cemented together.

Values associated with the conditional expressions in this embodiment are shown in Table 1. This numerical embodiment satisfies all the conditional expressions and achieves a wide angle with a focal length of 30.0 mm at the wide angle end and a high zoom ratio of 4.5 while having excellent optical performance. Furthermore, while the zoom lens according to this embodiment is configured to perform focusing using the fourth lens unit which is small and lightweight, the ratio of the angle of field at the wide angle end and that at the telephoto end, or the zoom ratio is as high as 4.4 even when the zoom lens is focused at the shortest distance (1.0 m from the image plane to the object).

Figure 11:
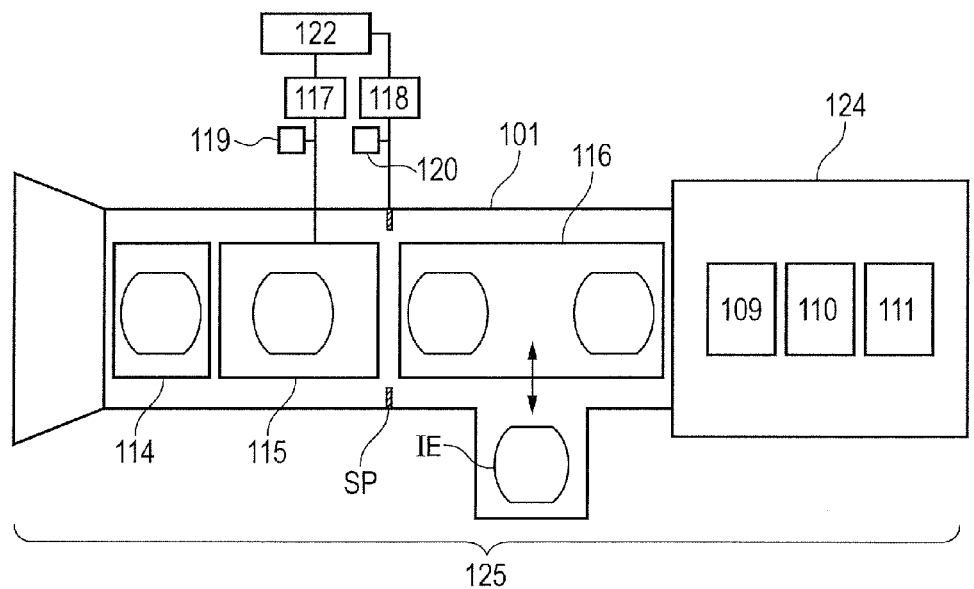
FIG. 11 is a schematic diagram showing relevant portions of an image pickup apparatus (television camera system) using a zoom lens according to one of the embodiment as a taking optical system.

In the following, an image pickup apparatus that uses one of the above-described zoom lenses as the taking optical system will be described. FIG. 11 is a schematic diagram showing the relevant portions of the image pickup apparatus (specifically, television camera system) using a zoom lens according to one of the above-described embodiments as the taking optical system. In FIG. 11, the apparatus has a zoom lens 101, which is the zoom lens according to one of the first to fourth embodiments.

The zoom lens 101 is detachably mounted on a camera 124. The camera 124 and the zoom lens 101 mounted thereon constitute an image pickup apparatus 125. The zoom lens 101 includes a first lens unit 114, a zoom lens unit 115 (also functions as a focus lens unit) including second and third lens units which move during zooming and a fourth lens unit which moves during zooming and focusing, and a fifth lens unit 116 for imaging. The zoom lens 101 also includes an aperture stop SP. The fifth lens unit 116, which is stationary during zooming and focusing, has a magnification changing optical system IE, which can be inserted into/retracted from the optical path.

The zoom lens unit 115 is provided with a driving system, by which the zoom lens unit 115 is driven along the optical axis direction. The driving system includes driving means 117, 118, such as motors, which electrically drives the zoom lens unit 115 and the aperture stop SP. The zoom lens is provided with detectors 119, 120, such as an encoder, a potentiometer, and/or photo sensor, which detect the positions of the lens units in the zoom lens unit 115 on the optical axis and the aperture diameter of the aperture stop SP. The driving system for the lens units in the zoom lens unit 115 may be either a mechanical system such as a helicoid and cam or an electric system such as an ultrasonic motor. The camera 124 has a glass block 109, which may be an optical filter and/or a color separation prism provided in the camera 124, and a solid-state image pickup device (photoelectric conversion element), such as a CCD sensor or a CMOS sensor, which receives optical image of an object formed by the zoom lens 101. The camera 124 and the zoom lens 101 also have CPUs 111, 122 which control various operations of the camera 124 and the zoom lens 101. With the use of the zoom lens according to the present invention in a television camera, an image pickup apparatus having excellent optical performance is achieved.

While preferred embodiments of the present invention have been described, the present invention is not limited to these embodiments, but various modifications and changes can be made thereto without departing from the essence of the invention.

In the following numerical embodiments 1 to 4 associated with the first to fourth embodiments of the present invention will be presented below. In the numerical embodiments, there are presented the surface number i counted from the object side, the radius of curvature ri of the i-th surface, the distance di between the i-th surface and the (i+1)-th surface, the refractive index ndi of the i-th optical member, and the Abbe number vdi of the i-th optical member. The last three surfaces are surfaces in the glass block such as a filter. All the values of the focal length, the F-number, and the half angle of field are for the state in which the zoom lenses are focused on an object at infinity. The value of BF is the distance from the last surface of the glass block or lens to the image plane expressed by the equivalent air distance.

The aspheric surface shapes are expressed by the following equation in terms of the x coordinate taken along the optical axis, the y coordinate taken along a direction perpendicular to the optical axis:

$$x=(y^2/r)/\{1+(1-k\times y^2/r^2)^{0.5}\}+A2\times y^2+A3\times y^3+A4\times y^4+A5\times y^5+A6\times y^6+A7\times y^7+A8\times y^8+A9\times y^9+A10\times y^{10}+A11\times y^{11}+A12\times y^{12},$$

where R is a base curvature radius, k is a conic constant, and An is a n-th order aspheric coefficient. The expression "e-x" stands for "×10$^{-x}$". The aspheric lens surfaces are indicated by asterisk * suffixed to their surface numbers.

Values associated with the conditional expressions described in the foregoing are presented in Table 1 for each of the embodiments.

Numeral Embodiment 1

Lengths in the following data are in millimeters.

Surface data

| Surface number | r | d | nd | vd | Effective Diameter |
|---|---|---|---|---|---|
| 1 | 654.233 | 2.54 | 1.84666 | 23.8 | 79.18 |
| 2 | 157.258 | 4.83 | | | 78.63 |
| 3 | 421.579 | 6.94 | 1.43387 | 95.1 | 79.11 |
| 4 | −235.111 | 0.00 | | | 79.35 |
| 5 | 119.050 | 9.29 | 1.59522 | 67.7 | 79.88 |
| 6 | −1163.984 | 0.15 | | | 79.49 |
| 7 | 70.181 | 8.27 | 1.61800 | 63.3 | 74.66 |
| 8 | 168.590 | (variable) | | | 73.54 |
| 9* | 8927.254 | 1.20 | 2.00100 | 29.1 | 31.09 |
| 10 | 23.457 | 6.44 | | | 26.20 |
| 11 | −39.433 | 4.50 | 1.92286 | 18.9 | 26.06 |
| 12 | −19.479 | 1.00 | 1.88300 | 40.8 | 26.12 |
| 13 | 52.813 | 2.26 | | | 26.06 |
| 14 | 61.635 | 3.86 | 1.71736 | 29.5 | 27.04 |
| 15 | −84.661 | (variable) | | | 27.13 |
| 16* | 160.206 | 3.86 | 1.59349 | 67.0 | 27.78 |
| 17 | −53.678 | 0.10 | | | 28.22 |
| 18 | 174.698 | 5.97 | 1.43875 | 94.9 | 28.46 |
| 19 | −29.331 | 1.00 | 1.78470 | 26.3 | 28.48 |
| 20 | −69.658 | 0.80 | | | 29.18 |
| 21 | 100.991 | 5.71 | 1.61800 | 63.3 | 29.40 |
| 22 | −38.304 | (variable) | | | 29.28 |
| 23 | −263.032 | 1.00 | 1.81600 | 46.6 | 20.35 |
| 24 | 19.380 | 2.99 | 1.80809 | 22.8 | 19.05 |
| 25 | 37.912 | (variable) | | | 18.49 |
| 26 (stop) | ∞ | 3.65 | | | 16.53 |
| 27 | −18.650 | 1.00 | 1.88300 | 40.8 | 16.12 |
| 28 | 48.787 | 2.16 | 1.84666 | 23.8 | 17.30 |
| 29 | −251.924 | 5.00 | | | 17.72 |
| 30 | −75.722 | 1.20 | 1.83481 | 42.7 | 20.34 |
| 31 | 76.311 | 6.51 | 1.62588 | 35.7 | 21.50 |
| 32 | −19.413 | 27.50 | | | 22.64 |
| 33 | 54.255 | 5.43 | 1.59349 | 67.0 | 24.98 |
| 34 | −33.923 | 1.00 | | | 24.95 |
| 35 | −34.464 | 1.40 | 1.88300 | 40.8 | 24.32 |
| 36 | 59.767 | 4.88 | 1.48749 | 70.2 | 24.75 |
| 37 | −40.949 | 0.20 | | | 25.12 |
| 38 | 156.636 | 5.10 | 1.43875 | 94.9 | 25.21 |
| 39 | −27.861 | 1.40 | 1.91082 | 35.3 | 25.16 |
| 40 | −79.018 | 0.20 | | | 25.92 |
| 41 | 100.377 | 3.73 | 1.61800 | 63.3 | 26.19 |
| 42 | −53.372 | 3.00 | | | 26.17 |
| 43 | ∞ | 33.00 | 1.60859 | 46.4 | 40.00 |
| 44 | ∞ | 13.20 | 1.51633 | 64.2 | 40.00 |
| 45 | ∞ | (BF) | | | 40.00 |
| Image Plane | ∞ | | | | |

Aspheric Surface Data 9-th surface

| | | |
|---|---|---|
| K = 1.05628e+005 | A4 = 6.43324e−006 | A6 = 7.17175e−008 |
| A8 = −2.14010e−010 | A10 = 6.96184e−013 | A12 = −9.78170e−016 |
| A3 = −2.34536e−006 | A5 = −5.42771e−007 | A7 = −2.74196e−009 |
| A9 = 6.77497e−012 | A11 = −7.21479e−015 | |

16-th surface

| | | |
|---|---|---|
| K = −2.67314e+001 | A4 = −1.02258e−005 | A6 = −9.96944e−008 |
| A8 = 1.44553e−010 | A10 = −5.18239e−013 | A12 = −2.09037e−015 |
| A3 = 5.98957e−006 | A5 = 8.05431e−007 | A7 = 4.24233e−009 |
| A9 = −1.64383e−011 | A11 = 8.10236e−014 | |

Various Data
Zoom Ratio 22.50

| | Wide Angle | Intermediate | telephoto |
|---|---|---|---|
| Focal Length | 8.00 | 112.00 | 180.00 |
| F number | 2.00 | 2.00 | 3.00 |
| Half angle of Field | 34.51 | 2.81 | 1.75 |
| Image Height | 5.50 | 5.50 | 5.50 |
| OLL | 298.12 | 298.12 | 298.12 |
| BF | 8.55 | 8.55 | 8.55 |
| d8 | 1.15 | 64.32 | 68.00 |
| d15 | 90.64 | 14.48 | 2.00 |
| d22 | 2.49 | 10.32 | 9.89 |
| d25 | 3.01 | 8.17 | 17.40 |
| d45 | 8.55 | 8.55 | 8.55 |
| Entrance PP | 45.51 | 677.52 | 1189.97 |
| Exit PP | 126.81 | 126.81 | 126.81 |
| Front PP | 54.05 | 895.59 | 1643.96 |
| Rear PP | 0.55 | −103.45 | −171.45 |

In the above table, "OLL" refers to the overall lens length, "Entrance PP" refers to the entrance pupil position, "Exit PP" refers to the exit pupil position, "Front PP" refers to the front principal point position, and "Rear PP" refers to the rear principal point position. These abbreviations also apply to similar data tables for numerical embodiments 2 to 4 presented in the following.

Zoom Lens Unit Data

| Unit | Leading Surface | Focal Length | Unit Length | Front PP | Rear PP |
|---|---|---|---|---|---|
| 1 | 1 | 100.00 | 32.02 | 15.48 | −5.98 |
| 2 | 9 | −17.00 | 19.26 | 0.87 | −14.70 |
| 3 | 16 | 28.20 | 17.44 | 7.44 | −4.98 |
| 4 | 23 | −40.00 | 3.99 | 1.89 | −0.29 |
| 5 | 26 | 29.59 | 119.57 | 37.93 | −7.75 |

Single Lens Data

| Lens | Leading Surface | Focal Length |
|---|---|---|
| 1 | 1 | −242.69 |
| 2 | 3 | 348.13 |
| 3 | 5 | 181.31 |
| 4 | 7 | 187.78 |
| 5 | 9 | −23.31 |
| 6 | 11 | 37.16 |
| 7 | 12 | −15.92 |
| 8 | 14 | 49.88 |
| 9 | 16 | 67.96 |
| 10 | 18 | 57.61 |
| 11 | 19 | −64.70 |

| | | |
|---|---|---|
| 12 | 21 | 45.48 |
| 13 | 23 | −21.97 |
| 14 | 24 | 45.28 |
| 15 | 27 | −15.09 |
| 16 | 28 | 47.96 |
| 17 | 30 | −45.11 |
| 18 | 31 | 25.23 |
| 19 | 33 | 35.87 |
| 20 | 35 | −24.44 |
| 21 | 36 | 50.48 |
| 22 | 38 | 54.23 |
| 23 | 39 | −47.55 |
| 24 | 41 | 56.70 |
| 25 | 43 | 0.00 |
| 26 | 44 | 0.00 |

Numeral Embodiment 2

Lengths in the following data are in millimeters.

Surface data

| Surface number | r | d | nd | vd | Effective Diameter |
|---|---|---|---|---|---|
| 1 | 196.447 | 2.50 | 1.77250 | 49.6 | 70.39 |
| 2 | 56.300 | 11.71 | | | 62.10 |
| 3 | −204.017 | 2.30 | 1.88300 | 40.8 | 62.10 |
| 4 | 397.255 | 7.15 | 1.61800 | 63.3 | 60.93 |
| 5 | −157.213 | 0.15 | | | 60.92 |
| 6 | 89.871 | 1.90 | 1.84666 | 23.8 | 62.66 |
| 7 | 69.040 | 12.75 | 1.43875 | 94.9 | 62.19 |
| 8 | −147.201 | 0.15 | | | 62.44 |
| 9 | 66.362 | 10.76 | 1.72916 | 54.7 | 62.34 |
| 10 | −481.682 | (variable) | | | 61.46 |
| 11* | 1219.045 | 1.50 | 1.88300 | 40.8 | 34.81 |
| 12 | 24.099 | 6.80 | | | 29.09 |
| 13 | −56.289 | 1.40 | 1.83481 | 42.7 | 29.09 |
| 14 | 59.014 | 0.10 | | | 29.09 |
| 15 | 44.250 | 8.61 | 1.76182 | 26.5 | 29.46 |
| 16 | −26.729 | 1.30 | 1.88300 | 40.8 | 29.34 |
| 17 | −83.819 | (variable) | | | 29.44 |
| 18 | 506.992 | 5.15 | 1.49700 | 81.5 | 23.99 |
| 19 | −38.934 | 0.15 | | | 24.66 |
| 20 | 51.641 | 5.74 | 1.72916 | 54.7 | 24.68 |
| 21 | −30.423 | 1.40 | 1.84666 | 23.8 | 24.34 |
| 22 | −107.336 | (variable) | | | 23.91 |
| 23 | −47.360 | 2.87 | 1.84666 | 23.8 | 16.84 |
| 24 | −19.140 | 1.20 | 1.77250 | 49.6 | 16.73 |
| 25 | 130.286 | (variable) | | | 16.35 |
| 26 (stop) | ∞ | 1.00 | | | 15.68 |
| 27 | 15.310 | 2.62 | 1.59522 | 67.7 | 15.37 |
| 28 | 23.659 | 3.43 | | | 14.56 |
| 29 | −707.868 | 1.96 | 1.84666 | 23.8 | 13.70 |
| 30 | −76.911 | 1.50 | 1.80100 | 35.0 | 13.37 |
| 31 | 32.126 | 15.00 | | | 12.87 |
| 32 | 86.740 | 5.21 | 1.49700 | 81.5 | 17.31 |
| 33 | −24.325 | 4.57 | | | 18.23 |
| 34 | −14.665 | 1.50 | 1.72047 | 34.7 | 18.43 |
| 35 | −39.841 | 2.00 | | | 20.70 |
| 36 | 63.838 | 5.80 | 1.43875 | 94.9 | 24.17 |
| 37 | −27.569 | (BF) | | | 24.81 |
| Image Plane | ∞ | | | | |

Aspheric Surface Data
11-th surface

K = −2.20979e+002   A4 = 1.09733e−006   A6 = −8.78150e−009
A8 = 5.53246e−012   A10 = −4.67695e−015   A12 = 4.21412e−018
A5 = 1.02267e−007   A7 = 3.49145e−011   A9 = 8.13078e−014
A11 = −2.87416e−016

Various Data
Zoom Ratio 5.00

| | Wide Angle | Intermediate | telephoto |
|---|---|---|---|
| Focal Length | 20.00 | 50.00 | 100.00 |
| F number | 4.00 | 4.00 | 4.00 |
| Half Field Angle | 36.50 | 16.49 | 8.42 |
| Image Height | 14.80 | 14.80 | 14.80 |
| OLL | 238.40 | 238.40 | 238.40 |
| BF | 39.90 | 39.90 | 39.90 |
| d10 | 0.70 | 25.53 | 39.48 |
| d17 | 59.72 | 26.10 | 5.93 |
| d22 | 2.95 | 9.79 | 16.12 |
| d25 | 4.97 | 6.92 | 6.80 |
| d37 | 39.90 | 39.90 | 39.90 |
| Entrance PP | 46.70 | 93.50 | 165.23 |
| Exit PP | −81.04 | −81.04 | −81.04 |
| Front PP | 63.39 | 122.83 | 182.54 |
| Rear PP | 19.90 | −10.10 | −60.10 |

Zoom Lens Unit Data

| Unit | Leading Surface | Focal Length | Unit Length | Front PP | Rear PP |
|---|---|---|---|---|---|
| 1 | 1 | 77.40 | 49.37 | 39.32 | 14.20 |
| 2 | 11 | −24.60 | 19.71 | 0.50 | −14.24 |
| 3 | 18 | 32.00 | 12.43 | 4.04 | −3.71 |
| 4 | 23 | −50.00 | 4.07 | 0.34 | −1.86 |
| 5 | 26 | 79.54 | 44.59 | 38.54 | −6.28 |

Single Lens Data

| Lens | Leading Surface | Focal Length |
|---|---|---|
| 1 | 1 | −102.47 |
| 2 | 3 | −151.50 |
| 3 | 4 | 182.48 |
| 4 | 6 | −363.63 |
| 5 | 7 | 108.81 |
| 6 | 9 | 80.31 |
| 7 | 11 | −27.70 |
| 8 | 13 | −34.13 |
| 9 | 15 | 22.89 |
| 10 | 16 | −44.66 |
| 11 | 18 | 72.77 |
| 12 | 20 | 26.94 |
| 13 | 21 | −50.07 |
| 14 | 23 | 35.89 |
| 15 | 24 | −21.42 |
| 16 | 27 | 65.00 |
| 17 | 29 | 100.77 |
| 18 | 30 | −27.93 |
| 19 | 32 | 38.72 |
| 20 | 34 | −32.82 |
| 21 | 36 | 44.64 |

Numeral Embodiment 3

Lengths in the following data are in millimeters.

Surface data

| Surface number | r | d | nd | vd | Effective Diameter |
|---|---|---|---|---|---|
| 1 | 518.906 | 4.70 | 1.81600 | 46.6 | 156.52 |
| 2 | 123.591 | 29.28 | | | 136.86 |
| 3 | −284.158 | 4.50 | 1.88300 | 40.8 | 136.65 |
| 4 | 477.341 | 1.00 | | | 134.30 |
| 5 | 293.440 | 9.26 | 1.80518 | 25.4 | 134.30 |
| 6 | 882.797 | 10.00 | | | 133.46 |
| 7 | −2699.722 | 14.81 | 1.49700 | 81.5 | 131.75 |
| 8 | −190.955 | 0.50 | | | 131.13 |

-continued

| | | | | | |
|---|---|---|---|---|---|
| 9 | 211.640 | 4.40 | 1.80518 | 25.4 | 127.11 |
| 10 | 140.247 | 26.22 | 1.43875 | 94.9 | 126.76 |
| 11 | −291.070 | 5.00 | | | 127.65 |
| 12 | 219.003 | 18.11 | 1.59522 | 67.7 | 130.43 |
| 13 | −410.804 | 0.15 | | | 129.96 |
| 14 | 112.272 | 14.55 | 1.49700 | 81.5 | 119.70 |
| 15 | 304.474 | (variable) | | | 117.58 |
| 16 | 87.108 | 1.50 | 1.88300 | 40.8 | 45.86 |
| 17 | 38.063 | 4.00 | | | 40.27 |
| 18 | 92.382 | 1.50 | 1.77250 | 49.6 | 39.70 |
| 19 | 58.152 | 8.24 | | | 37.42 |
| 20 | −39.868 | 1.50 | 1.88300 | 40.8 | 36.62 |
| 21 | 289.871 | 1.00 | | | 36.81 |
| 22 | −3705.734 | 5.78 | 1.92286 | 18.9 | 36.87 |
| 23 | −46.779 | 0.10 | | | 37.06 |
| 24 | −67.914 | 1.50 | 1.81600 | 46.6 | 35.98 |
| 25 | 515.522 | (variable) | | | 35.53 |
| 26 | −60.113 | 1.95 | 1.69895 | 30.1 | 36.32 |
| 27 | 520.488 | 10.32 | 1.58913 | 61.1 | 38.86 |
| 28 | −38.307 | 0.15 | | | 41.01 |
| 29 | 149.316 | 8.94 | 1.61800 | 63.3 | 42.11 |
| 30 | −51.882 | 2.00 | 1.84666 | 23.8 | 42.05 |
| 31 | −132.999 | 0.15 | | | 42.49 |
| 32 | 54.491 | 6.43 | 1.61800 | 63.3 | 41.87 |
| 33 | −838.875 | (variable) | | | 41.12 |
| 34 | −369.746 | 1.50 | 1.75500 | 52.3 | 31.32 |
| 35 | 34.024 | 4.07 | 1.92286 | 18.9 | 29.62 |
| 36 | 57.340 | (variable) | | | 28.67 |
| 37 (stop) | ∞ | 6.70 | | | 23.68 |
| 38 | −21.444 | 1.80 | 1.75500 | 52.3 | 22.80 |
| 39 | 74.454 | 7.36 | 1.72825 | 28.5 | 25.17 |
| 40 | −28.037 | 25.00 | | | 26.37 |
| 41 | −36.305 | 1.80 | 1.75500 | 52.3 | 24.48 |
| 42 | 57.433 | 8.55 | 1.54814 | 45.8 | 25.91 |
| 43 | −24.419 | 0.50 | | | 27.01 |
| 44 | −92.521 | 1.80 | 1.83400 | 37.2 | 26.51 |
| 45 | 34.029 | 7.70 | 1.48749 | 70.2 | 26.82 |
| 46 | −50.052 | 0.50 | | | 27.67 |
| 47 | −240.047 | 6.93 | 1.49700 | 81.5 | 27.96 |
| 48 | −25.360 | 1.80 | 1.80518 | 25.4 | 28.36 |
| 49 | −44.010 | 1.00 | | | 29.55 |
| 50 | 46.394 | 7.27 | 1.48749 | 70.2 | 29.75 |
| 51 | −59.416 | 3.00 | | | 29.16 |
| 52 | ∞ | 50.00 | 1.51633 | 64.2 | 27.09 |
| 53 | ∞ | (BF) | | | 15.64 |
| Image Plane | ∞ | | | | |

Various Data
Zoom Ratio 30.25

| | Wide Angle | Intermediate | telephoto |
|---|---|---|---|
| Focal Length | 6.40 | 118.00 | 193.60 |
| F number | 1.80 | 1.80 | 2.24 |
| Half Field Angle | 40.68 | 2.67 | 1.63 |
| Image Height | 5.50 | 5.50 | 5.50 |
| OLL | 508.21 | 508.21 | 508.21 |
| BF | 13.28 | 13.28 | 13.28 |
| d15 | 1.20 | 100.81 | 108.34 |
| d25 | 151.56 | 22.58 | 5.62 |
| d33 | 3.00 | 14.87 | 8.19 |
| d36 | 4.34 | 21.83 | 37.94 |
| d53 | 13.28 | 13.28 | 13.28 |
| Entrance PP | 91.78 | 693.59 | 1266.90 |
| Exit PP | 108.99 | 108.99 | 108.99 |
| Front PP | 98.61 | 957.09 | 1852.14 |
| Rear PP | 6.88 | −104.72 | −180.32 |

Zoom Lens Unit Data

| Unit | Leading Surface | Focal Length | Unit Length | Front PP | Rear PP |
|---|---|---|---|---|---|
| 1 | 1 | 113.00 | 142.48 | 97.45 | 36.73 |
| 2 | 16 | −25.00 | 25.13 | 7.38 | −11.51 |
| 3 | 26 | 42.00 | 29.94 | 14.53 | −2.55 |
| 4 | 34 | −76.40 | 5.57 | 3.33 | 0.37 |
| 5 | 37 | ∞ | 0.00 | 0.00 | −0.00 |
| 6 | 38 | 36.35 | 125.02 | 46.25 | −6.9 |

Single Lens Data

| Lens | Leading Surface | Focal Length |
|---|---|---|
| 1 | 1 | −198.87 |
| 2 | 3 | −200.00 |
| 3 | 5 | 537.10 |
| 4 | 7 | 411.44 |
| 5 | 9 | −526.14 |
| 6 | 10 | 219.24 |
| 7 | 12 | 241.75 |
| 8 | 14 | 348.04 |
| 9 | 16 | −77.23 |
| 10 | 18 | −206.14 |
| 11 | 20 | −39.38 |
| 12 | 22 | 50.67 |
| 13 | 24 | −73.08 |
| 14 | 26 | −76.40 |
| 15 | 27 | 60.75 |
| 16 | 29 | 63.14 |
| 17 | 30 | −100.63 |
| 18 | 32 | 82.71 |
| 19 | 34 | −41.02 |
| 20 | 35 | 82.59 |
| 21 | 38 | −21.78 |
| 22 | 39 | 28.61 |
| 23 | 41 | −29.09 |
| 24 | 42 | 32.30 |
| 25 | 44 | −29.45 |
| 26 | 45 | 42.70 |
| 27 | 47 | 56.28 |
| 28 | 48 | −76.97 |
| 29 | 50 | 54.49 |
| 30 | 52 | 0.00 |

Numeral Embodiment 4

Lengths in the following data are in millimeters.

Surface data

| Surface number | r | d | nd | vd | Effective Diameter |
|---|---|---|---|---|---|
| 1 | 286.694 | 3.20 | 1.80518 | 25.4 | 80.00 |
| 2 | 100.851 | 1.11 | | | 78.01 |
| 3 | 116.162 | 8.57 | 1.43875 | 94.9 | 78.01 |
| 4 | −6296.342 | 0.15 | | | 77.93 |
| 5 | 91.855 | 8.54 | 1.59522 | 67.7 | 77.21 |
| 6 | 439.011 | 0.15 | | | 76.56 |
| 7 | 78.714 | 8.27 | 1.72916 | 54.7 | 72.72 |
| 8 | 274.912 | (variable) | | | 71.48 |
| 9 | 476.049 | 1.50 | 1.88300 | 40.8 | 34.00 |
| 10 | 22.257 | 7.11 | | | 28.68 |
| 11 | −55.651 | 1.40 | 1.72916 | 54.7 | 28.68 |
| 12 | 100.654 | 0.22 | | | 29.20 |
| 13 | 43.650 | 7.51 | 1.75520 | 27.5 | 30.00 |
| 14 | −48.356 | 1.30 | 1.83481 | 42.7 | 29.79 |
| 15 | −223.744 | (variable) | | | 29.63 |
| 16 | −457.817 | 4.46 | 1.61800 | 63.3 | 23.74 |
| 17 | −46.659 | 0.15 | | | 24.32 |
| 18 | 50.791 | 5.51 | 1.58913 | 61.1 | 24.25 |
| 19 | −31.728 | 1.40 | 1.80518 | 25.4 | 23.91 |
| 20 | −72.556 | (variable) | | | 23.73 |
| 21 | −73.912 | 2.99 | 1.84666 | 23.8 | 19.76 |
| 22 | −25.570 | 1.20 | 1.83481 | 42.7 | 19.60 |
| 23 | 100.723 | (variable) | | | 19.25 |
| 24 (stop) | ∞ | 6.63 | | | 19.01 |
| 25 | 17.734 | 3.73 | 1.49700 | 81.5 | 18.85 |
| 26 | 20.576 | 6.57 | | | 17.61 |
| 27 | 41.633 | 2.00 | 1.80000 | 29.8 | 16.75 |
| 28 | 29.280 | 7.62 | | | 16.13 |

-continued

| | | | | | |
|---|---|---|---|---|---|
| 29 | 52.584 | 3.94 | 1.59349 | 67.0 | 19.28 |
| 30 | −36.012 | 2.50 | | | 19.56 |
| 31 | −21.028 | 1.50 | 1.84666 | 23.8 | 19.46 |
| 32 | −29.449 | 2.00 | | | 20.36 |
| 33 | 22.800 | 2.94 | 1.43875 | 94.9 | 21.54 |
| 34 | 21.249 | (BF) | | | 20.94 |
| Image Plane | ∞ | | | | |

Various Data
Zoom Ratio 4.5

| | Wide Angle | Intermediate | telephoto |
|---|---|---|---|
| Focal Length | 30.00 | 75.00 | 135.00 |
| F number | 3.50 | 3.50 | 3.50 |
| Half Field Angle | 26.26 | 11.16 | 6.26 |
| Image Height | 14.80 | 14.80 | 14.80 |
| OLL | 219.68 | 219.68 | 219.68 |
| BF | 44.00 | 44.00 | 44.00 |
| d8 | 0.70 | 28.43 | 42.91 |
| d15 | 52.42 | 23.67 | 6.50 |
| d20 | 2.84 | 9.16 | 8.43 |
| d23 | 15.56 | 10.25 | 13.68 |
| d34 | 44.00 | 44.00 | 44.00 |
| Entrance PP | 55.69 | 158.10 | 308.75 |
| Exit PP | −40.38 | −40.38 | −40.38 |
| Front PP | 75.02 | 166.44 | 227.77 |
| Rear PP | 14.00 | −31.00 | −91.00 |

Zoom Lens Unit Data

| Unit | Leading Surface | Focal Length | Length | Front PP | Rear PP |
|---|---|---|---|---|---|
| 1 | 1 | 94.50 | 29.98 | 11.39 | −7.70 |
| 2 | 9 | −26.50 | 19.04 | 0.26 | −14.12 |
| 3 | 16 | 36.50 | 11.52 | 3.82 | −3.40 |
| 4 | 21 | −51.29 | 4.19 | 0.92 | −1.32 |
| 5 | 24 | 70.86 | 39.43 | 15.79 | −20.07 |

Single Lens Data

| Lens | Leading Surface | Focal Length |
|---|---|---|
| 1 | 1 | −192.94 |
| 2 | 3 | 259.41 |
| 3 | 5 | 192.70 |
| 4 | 7 | 147.97 |
| 5 | 9 | −26.33 |
| 6 | 11 | −48.75 |
| 7 | 13 | 31.22 |
| 8 | 14 | −73.74 |
| 9 | 16 | 83.41 |
| 10 | 18 | 33.86 |
| 11 | 19 | −70.47 |
| 12 | 21 | 44.46 |
| 13 | 22 | −24.19 |
| 14 | 25 | 179.25 |
| 15 | 27 | −131.92 |
| 16 | 29 | 36.49 |
| 17 | 31 | −93.70 |
| 18 | 33 | −1686.87 |

TABLE 1

| | item | | E1 | E2 | E3 | E4 |
|---|---|---|---|---|---|---|
| | 1st unit FL | f1 | 100.00 | 77.40 | 113.00 | 94.50 |
| | 2nd unit FL | f2 | −17.00 | −24.60 | −25.00 | −26.50 |
| | 3rd unit FL | f3 | 28.20 | 32.00 | 42.00 | 36.50 |
| | 4th unit FL | f4 | −40.00 | −50.00 | −76.00 | −51.29 |
| | 5th unit FL | f5 | 29.59 | 79.54 | 36.35 | 70.86 |
| infinity focus at wide angle end | 2nd unit LM | β2winf | −0.23 | −0.37 | −0.22 | −0.45 |
| | 3rd unit LM | β3winf | −0.27 | −0.40 | −0.25 | −0.51 |
| | 4th unit LM | β4winf | 2.94 | 4.11 | 2.34 | 14.67 |
| | 5th unit LM | β5winf | 0.45 | 0.42 | 0.44 | 0.10 |
| infinity focus at telephoto end | 2nd unit LM | β2tinf | −2.09 | −0.91 | −2.78 | −1.55 |
| | 3rd unit LM | β3tinf | −0.58 | −0.82 | −0.50 | −0.66 |
| | 4th unit LM | β4tinf | 3.30 | 4.15 | 2.78 | 14.64 |
| | 5th unit LM | β5tinf | 0.45 | 0.42 | 0.44 | 0.10 |
| shortest focus distance at wide angle end | 2nd unit LM | β2wmod | −0.19 | −0.33 | −0.18 | −0.37 |
| | 3rd unit LM | β3wmod | −0.27 | −0.41 | −0.25 | −0.52 |
| | 4th unit LM | β4wmod | 2.94 | 4.11 | 2.34 | 14.66 |
| | 5th unit LM | β5wmod | 0.45 | 0.42 | 0.44 | 0.10 |
| shortest focus distance at telephoto end | 2nd unit LM | β2tmod | −0.83 | −0.70 | −0.81 | −0.89 |
| | 3rd unit LM | β3tmod | −1.04 | −0.94 | −1.20 | −0.96 |
| | 4th unit LM | β4tmod | 2.94 | 4.06 | 2.32 | 14.42 |
| | 5th unit LM | β5tmod | 0.45 | 0.42 | 0.44 | 0.10 |
| | zoom ratio at infinity focus | Zinf | 22.50 | 5.00 | 30.25 | 4.50 |
| | zoom ratio at shortest focus distance | Zmod | 16.55 | 4.81 | 21.00 | 4.38 |
| | shift amount of focus shift unit at TE | Δfocus | 14.40 | 4.30 | 34.94 | 11.18 |
| | FL at WE | fw | 8.00 | 20.00 | 6.40 | 30.00 |
| | FL at TE | ft | 180.00 | 100.00 | 193.61 | 135.00 |
| | 2nd unit MA | m2 | 66.85 | 38.78 | 107.14 | 42.21 |
| | 3rd unit MA | m3 | −21.79 | −15.00 | −38.80 | −3.71 |
| | 4th unit MA | m4 | −14.39 | −1.83 | −33.61 | 1.88 |
| | image size | IS | 11.10 | 29.60 | 11.10 | 29.60 |
| conditional expression | conditional expression 1 | | 0.25 | 0.44 | 0.20 | 0.18 |
| | conditional expression 2 | | 0.71 | 0.64 | 0.55 | 0.71 |
| | conditional expression 3 | | 2.35 | 2.03 | 3.06 | 1.94 |
| | conditional expression 4 | | 1.99 | 2.85 | 1.33 | 1.96 |
| | conditional expression 5 | | 1.80 | 1.29 | 1.71 | 1.43 |

TABLE 1-continued

| item | E1 | E2 | E3 | E4 |
|---|---|---|---|---|
| conditional expression 6 | −5.88 | −3.15 | −4.52 | −3.57 |
| conditional expression 7 | 3.55 | 2.42 | 2.69 | 2.59 |
| conditional expression 8 | 2.50 | 1.55 | 1.48 | 1.84 |
| conditional expression 9 | 0.18 | 0.10 | 0.12 | 0.07 |
| conditional expression 10 | 0.74 | 0.96 | 0.69 | 0.97 |
| conditional expression 11 | 3.01 | 4.97 | 4.34 | 15.56 |

E1 to E4: first to fourth embodiments
FL: focal length
LM: lateral magnification
MA: moving amount
WE: wide angle end
TE: telephoto end While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-114180, filed May 30, 2013, which is hereby incorporated by reference herein in its entirety.

What is claimed is:

1. A zoom lens comprising, in order from the object side to the image side, a first lens unit having positive refractive power which does not move for zooming or focusing, a second lens unit having negative refractive power which moves during zooming, a third lens unit having positive refractive power which moves during zooming, a fourth lens unit having negative refractive power which moves during zooming and focusing, and a fifth lens unit having positive refractive power which does not move for zooming or focusing,
   wherein an aperture stop which does not move for zooming or focusing is arranged adjacent to the fourth lens unit, and the following conditions are satisfied:

$0.10 < LN(|\beta 3_{tinf}/\beta 3_{winf}|)/LN(Z_{inf}) < 0.70$, $0.35 < |f3/f4| < 0.85$, $1.0 < f4/f2 < 4.0$, and $0.6 < (1-\beta 4_{tinf}^2) \times \beta 5_{tinf}^2 < 4.0$, where f2, f3, and f4 are focal lengths of the second lens unit, the third lens unit, and the fourth lens unit respectively, $Z_{inf}$ is a zoom ratio of the zoom lens when the zoom lens is focused on an object at infinity, $\beta 3_{winf}$ and $\beta 3_{tinf}$ are the lateral magnifications of the third lens unit at the wide angle end and at the telephoto end respectively when the zoom lens is focused on an object at infinity, and $\beta 4_{tinf}$ and $\beta 5_{tinf}$ are the lateral magnifications of the fourth lens unit and the fifth lens unit respectively at the telephoto end when the zoom lens is focused on an object at infinity.

2. The zoom lens according to claim 1, wherein the following condition is satisfied:

$0.8 < ft/f1 < 4.0$, where f1 is the focal length of the first lens unit, and ft is the focal length of the zoom lens at the telephoto end.

3. The zoom lens according to claim 1, wherein the following condition is satisfied:

$-10.0 < f1/f2 < -3.0$, where f1 is the focal length of the first lens unit, and f2 is the focal length of the second lens unit.

4. The zoom lens according to claim 1, wherein the following condition is satisfied:

$2.0 < f1/f3 < 4.5$, where f1 is the focal length of the first lens unit, and f3 is the focal length of the third lens unit.

5. The zoom lens according to claim 1, wherein the following condition is satisfied:

$1.0 < |f1/f4| < 4.0$, where f1 is the focal length of the first lens unit, and f4 is the focal length of the fourth lens unit.

6. An image pickup apparatus comprising:
   a zoom lens including, in order from the object side to the image side, a first lens unit having positive refractive power which does not move for zooming or focusing, a second lens unit having negative refractive power which moves during zooming, a third lens unit having positive refractive power which moves during zooming, a fourth lens unit having negative refractive power which moves during zooming and focusing, and a fifth lens unit having positive refractive power which does not move for zooming or focusing, further including an aperture stop which does not move for zooming or focusing and is arranged adjacent to the fourth lens unit, and satisfying the following conditions:

$0.10 < LN(|\beta 3_{tinf}/\beta 3_{winf}|)/LN(Z_{inf}) < 0.70$, $0.35 < |f3/f4| < 0.85$, $1.0 < f4/f2 < 4.0$, and $0.6 < (1-\beta 4_{tinf}^2) \times \beta 5_{tinf}^2 < 4.0$, where f2, f3, and f4 are focal lengths of the second lens unit, the third lens unit, and the fourth lens unit respectively, $Z_{inf}$ is a zoom ratio of the zoom lens when the zoom lens is focused on an object at infinity, $\beta 3_{winf}$ and $\beta 3_{tinf}$ are the lateral magnifications of the third lens unit at the wide angle end and at the telephoto end respectively when the zoom lens is focused on an object at infinity, and $\beta 4_{tinf}$ and $\beta 5_{tinf}$ are the lateral magnifications of the fourth lens unit and the fifth lens unit respectively at the telephoto end when the zoom lens is focused on an object at infinity; and
   an image pickup device which receives an image formed by the zoom lens.

7. The image pickup apparatus according to claim 6, wherein the following condition is satisfied:

$0.02 < [(1-\beta 4_{tinf}^2) \times \beta 5_{tinf}^2]/IS < 0.25$, where, IS is the image size of the image pickup device.

* * * * *